US012224518B2

(12) United States Patent
Wang et al.

(10) Patent No.: US 12,224,518 B2
(45) Date of Patent: Feb. 11, 2025

(54) MALE CONNECTOR AND FEMALE CONNECTOR

(71) Applicant: Bizlink Electronic (Xiamen) Co., Ltd, Fujian (CN)

(72) Inventors: Xiangwu Wang, Xiamen (CN); Zhongxiang Wang, Xiamen (CN); Weiming Lin, Xiamen (CN)

( * ) Notice: Subject to any disclaimer, the term of this patent is extended or adjusted under 35 U.S.C. 154(b) by 332 days.

(21) Appl. No.: 17/858,064

(22) Filed: Jul. 5, 2022

(65) Prior Publication Data

US 2023/0011560 A1 Jan. 12, 2023

(30) Foreign Application Priority Data

Jul. 6, 2021 (CN) ........................ 202110761128.X
Nov. 15, 2021 (CN) ........................ 202122792114.2

(51) Int. Cl.

*H01R 13/514* (2006.01)
*H01R 13/05* (2006.01)
*H01R 13/11* (2006.01)
*H01R 13/502* (2006.01)

(52) U.S. Cl.

CPC ........... *H01R 13/514* (2013.01); *H01R 13/05* (2013.01); *H01R 13/11* (2013.01); *H01R 13/502* (2013.01)

(58) Field of Classification Search

CPC ...... H01R 13/514; H01R 13/05; H01R 13/11; H01R 13/502; H01R 13/50; H01R 24/30; H01R 24/22; H01R 2103/00
USPC .......................................................... 439/701
See application file for complete search history.

(56) References Cited

U.S. PATENT DOCUMENTS

| | | | | | |
|---|---|---|---|---|---|
| 2,750,572 | A * | 6/1956 | Fox | H01R 13/28 | 220/8 |
| 3,605,059 | A * | 9/1971 | Lipinski | H01R 24/28 | 439/690 |
| 4,074,926 | A * | 2/1978 | Broad | H01R 13/53 | 439/598 |
| 4,368,939 | A * | 1/1983 | Foederer | H01R 24/76 | 439/594 |
| 5,336,116 | A * | 8/1994 | Boteler | H01R 24/66 | 439/690 |
| 5,997,349 | A * | 12/1999 | Yoshioka | H01R 13/6593 | 439/579 |
| 6,887,106 | B2 * | 5/2005 | Noguchi | H01R 13/6582 | 439/607.41 |
| 7,901,249 | B1 * | 3/2011 | Chen | H01R 24/38 | 439/607.4 |
| 8,123,573 | B2 * | 2/2012 | Takehara | H01R 13/53 | 439/845 |
| 8,128,440 | B2 * | 3/2012 | Matsumoto | B60L 53/16 | 439/731 |
| 8,506,313 | B2 * | 8/2013 | Fukuda | H01R 13/639 | 439/262 |

(Continued)

*Primary Examiner* — Alexander Gilman

(57) ABSTRACT

A female connector and a male connector are disclosed. The female connector includes a ring-shaped outer wall, a first terminal seat, a second terminal seat, and a third terminal seat. The male connector includes a front connecting block. A front end surface of the front connecting block includes a first terminal hole, a second terminal hole, and a third terminal hole. The first terminal hole has a first terminal supporting surface. The second terminal hole has a second terminal supporting surface. The third terminal hole has a third terminal supporting surface.

18 Claims, 26 Drawing Sheets

(56) References Cited

U.S. PATENT DOCUMENTS

| | | | | |
|---|---|---|---|---|
| 8,608,498 | B2 * | 12/2013 | Suzuki | H01R 13/193 439/269.2 |
| 8,882,547 | B2 * | 11/2014 | Asakuma | H01R 4/42 439/810 |
| 9,231,337 | B2 * | 1/2016 | Sakakura | H01R 13/5837 |
| 9,312,646 | B2 * | 4/2016 | Kuji | H01R 13/639 |
| 10,763,608 | B1 * | 9/2020 | Wang | H01R 27/00 |
| 2002/0155751 | A1 * | 10/2002 | Kato | H01R 13/5812 439/473 |
| 2008/0064248 | A1 * | 3/2008 | Huang | H01R 13/639 439/346 |
| 2009/0075506 | A1 * | 3/2009 | Suzuki | H01R 13/62938 439/157 |
| 2010/0120284 | A1 * | 5/2010 | Oka | H01R 13/44 439/372 |
| 2012/0184152 | A1 * | 7/2012 | Kataoka | H01R 24/28 439/660 |
| 2012/0238130 | A1 * | 9/2012 | Osawa | H01R 13/5825 439/460 |
| 2012/0244755 | A1 * | 9/2012 | Suzuki | H01R 13/64 439/660 |
| 2019/0190183 | A1 * | 6/2019 | Kato | H01R 13/113 |
| 2023/0011560 | A1 * | 1/2023 | Wang | H01R 13/514 |

* cited by examiner

MALE CONNECTOR AND FEMALE CONNECTOR

BACKGROUND OF THE INVENTION

1. Field of the Invention

The present invention relates to connectors, and more particularly to a male connector and a female connector for power transmission.

2. Description of the Prior Art

Connectors are essential for the internal components of high-density servers. For a conventional female connector, due to the small creepage distance, the creepage phenomenon occurs easily. There is a great potential safety hazard. In addition, the partition arms between the terminal holes of the conventional female connector are too thin and are broken easily, which has the problem of low strength.

SUMMARY OF THE INVENTION

The primary object of the present invention is to provide a female connector with a large creepage distance.

Another object of the present invention is to provide a male connector with a large creepage distance.

In order to achieve the above object, the present invention adopts the following technical solutions:

(1) In the female connector of the present invention, the contours of end surfaces of a first terminal seat, a second terminal seat and a third terminal seat are designed to have a cup shape for a conductive terminal set of the first terminal seat, a conductive terminal set of the second terminal seat and a conductive terminal set of the third terminal seat to form blocking walls on both sides, so as to increase the creepage distance.

(2) The female connector of the present invention has a first partition wall to increase the creepage distance between the conductive terminal set in the second terminal seat and the conductive terminal set in the third terminal seat.

(3) The female connector of the present invention has a second partition wall to increase the creepage distance between the conductive terminal set in the second terminal seat and the conductive terminal set in the third terminal seat.

(4) In the male connector of the present invention, the distance between a first terminal supporting surface and a second terminal supporting surface in the thickness direction of a front connecting block is greater than the maximum inner diameter of a first terminal hole in the thickness direction of the front connecting block, so as to increase the creepage distance.

(5) In the male connector of the present invention, the distance between the first terminal supporting surface and a third terminal supporting surface in the thickness direction of the front connecting block is greater than the maximum inner diameter of the first terminal hole in the thickness direction of the front connecting block, which further increases the creepage distance.

(6) In the male connector of the present invention, each of the second terminal supporting surface and the third terminal supporting surface is provided with a thickened wall. The material thickness of the thickened wall in the thickness direction of the front connecting block is greater than the material thickness of the first terminal supporting surface in the thickness direction of the front connecting block, so as to increase the thickness of the separation between the first terminal hole, the second terminal hole and the third terminal hole. Thus, it won't be broken easily and the strength is improved.

DETAILED DESCRIPTION OF THE PREFERRED EMBODIMENTS

Figure 1:
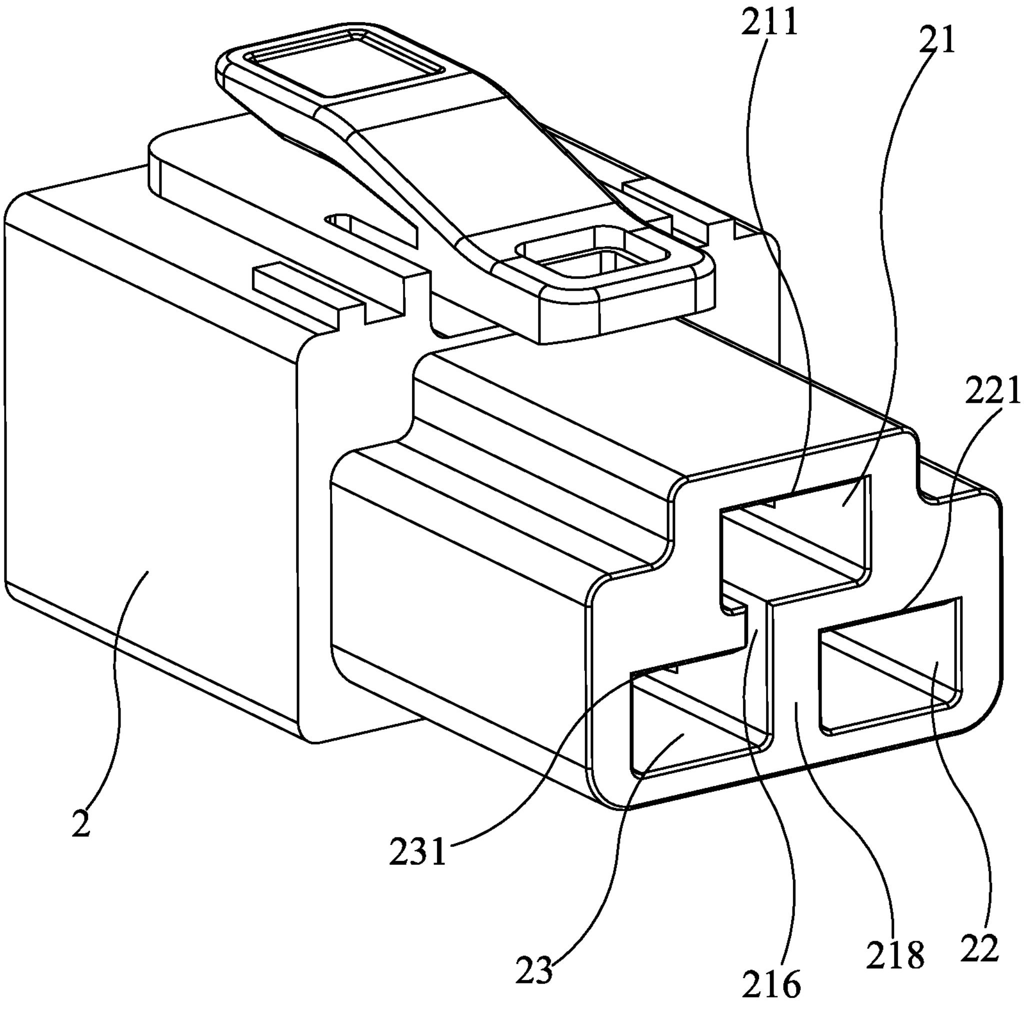
FIG. 1 is a perspective view of a first embodiment of the male connector of the present invention.

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Referring to FIG. 2, FIG. 4, FIG. 6 and FIG. 8, the present invention discloses a female connector, comprising a ring-shaped outer wall 1, a first terminal seat 11, a second terminal seat 12 and a third terminal seat 13. The first terminal seat 11, the second terminal seat 12 and the third terminal seat 13 are disposed inside the ring-shaped outer wall 1. As depicted in the figures, the term ring-shaped outer wall 1 is a hollow columnar structure while the contour thereof should not be limited to a circle. Moreover, at the end surface of the ring-shaped wall 1, an inner contour defined by an inner edge of the ring-shaped outer wall is different from an outer contour defined by an outer edge of the ring-shaped outer wall 1. A conductive terminal set 14 is disposed in each of the first terminal seat 11, the second terminal seat 12 and the third terminal seat 13. The contours of the end surfaces of the first terminal seat 11, the second terminal seat 12 and the third terminal seat 13 are substantially the same, each have a cup shape with an opening 111 facing the same direction. The conductive terminal set 14 is exposed via the corresponding opening 111 of the first terminal seat 11, the second terminal seat 12 and the third terminal seat 13. The second terminal seat 12 and the third terminal seat 13 are located at a position of the same thickness of the female connector, while the first terminal seat 11 is located at a position of a different thickness of the female connector, thereby forming a tower-shaped configuration/arranged in trefoil formation. That is to say, the first terminal seat 11 is arranged above the second terminal seat 12 and the third terminal seat 13, and the first terminal seat, the second terminal seat 12 and the third terminal seat 13 are evenly spaced. Each conductive terminal set 14 is exposed via the corresponding opening 111 of the first terminal seat 11, the second terminal seat 12 and the third terminal seat 13, so that the terminal of each conductive terminal set 14 faces the inner side of the ring-shaped outer wall 1. Each conductive terminal set 14 is exposed to each terminal seat, which means that when viewed from the outside to the inside of the lateral opening 111 of each terminal seat, the terminal unit 14 is not covered or blocked. In addition, the first terminal seat 11, the second terminal seat 12 and the third terminal seat 13 are located behind the side end surface of the ring-shaped outer wall 1, so as to prevent the user from getting an electric shock due to accidental touch. In addition, the cup shape, for example, is a U shape, V shape or other similar shapes. In this example, the first terminal seat 11, the second terminal seat 12 and the third terminal seat 13 each have a U shape and are one-piece formed with three flat plates that are connected. In addition, in this embodiment, each conductive terminal set 14 is completely embedded in each of the first terminal seat 111, the second terminal seat 112 and the third terminal seat 113, and does not extend out of the corresponding opening 111, thereby preventing excessive interference when a male connector is inserted. However, the present invention is not limited to this. When necessary, by adjusting the design of the male connector, each conductive terminal set 14 may extend out of the corresponding terminal seat respectively.

Figure 4:
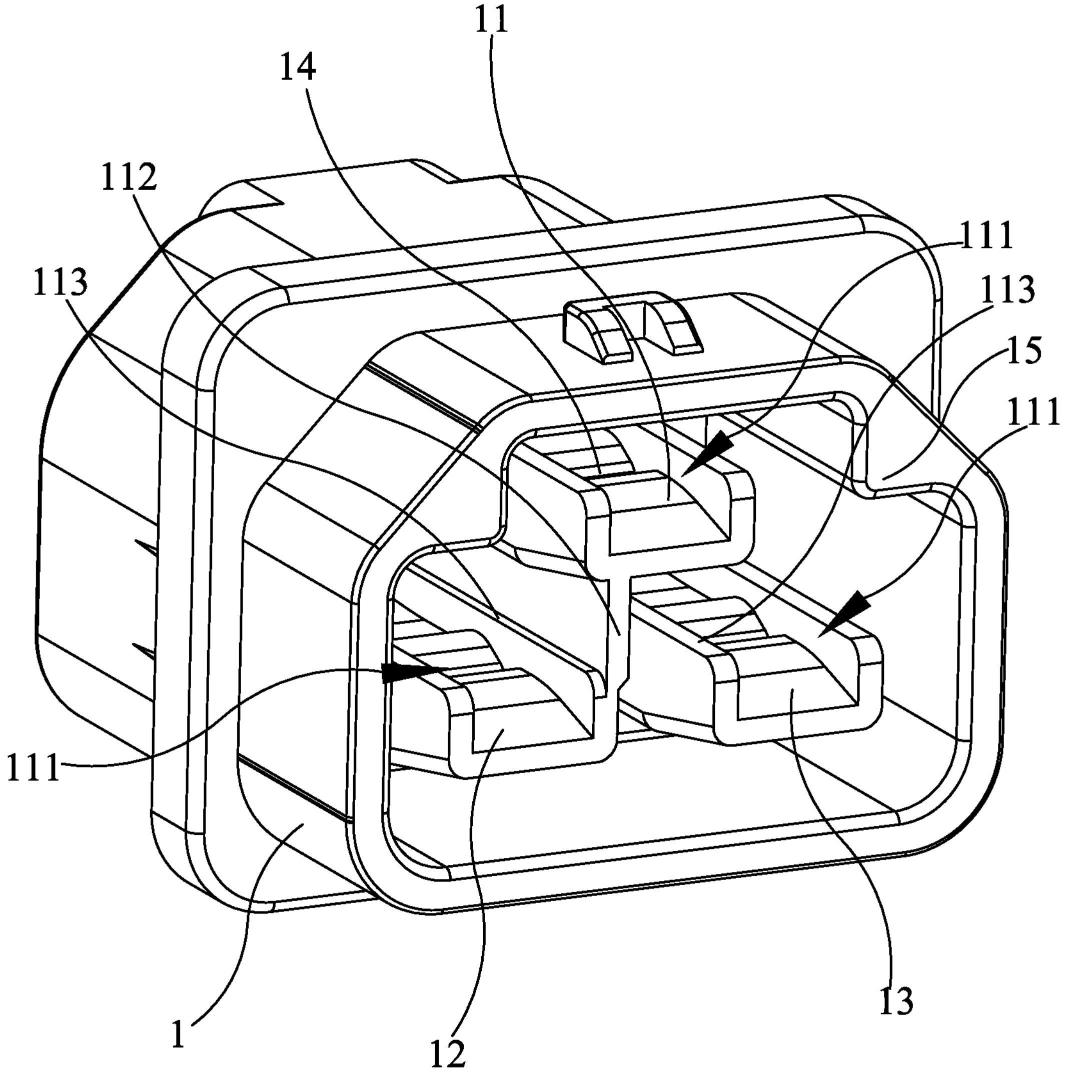
FIG. 4 is a perspective view of a second embodiment of the female connector of the present invention.
Figure 6:
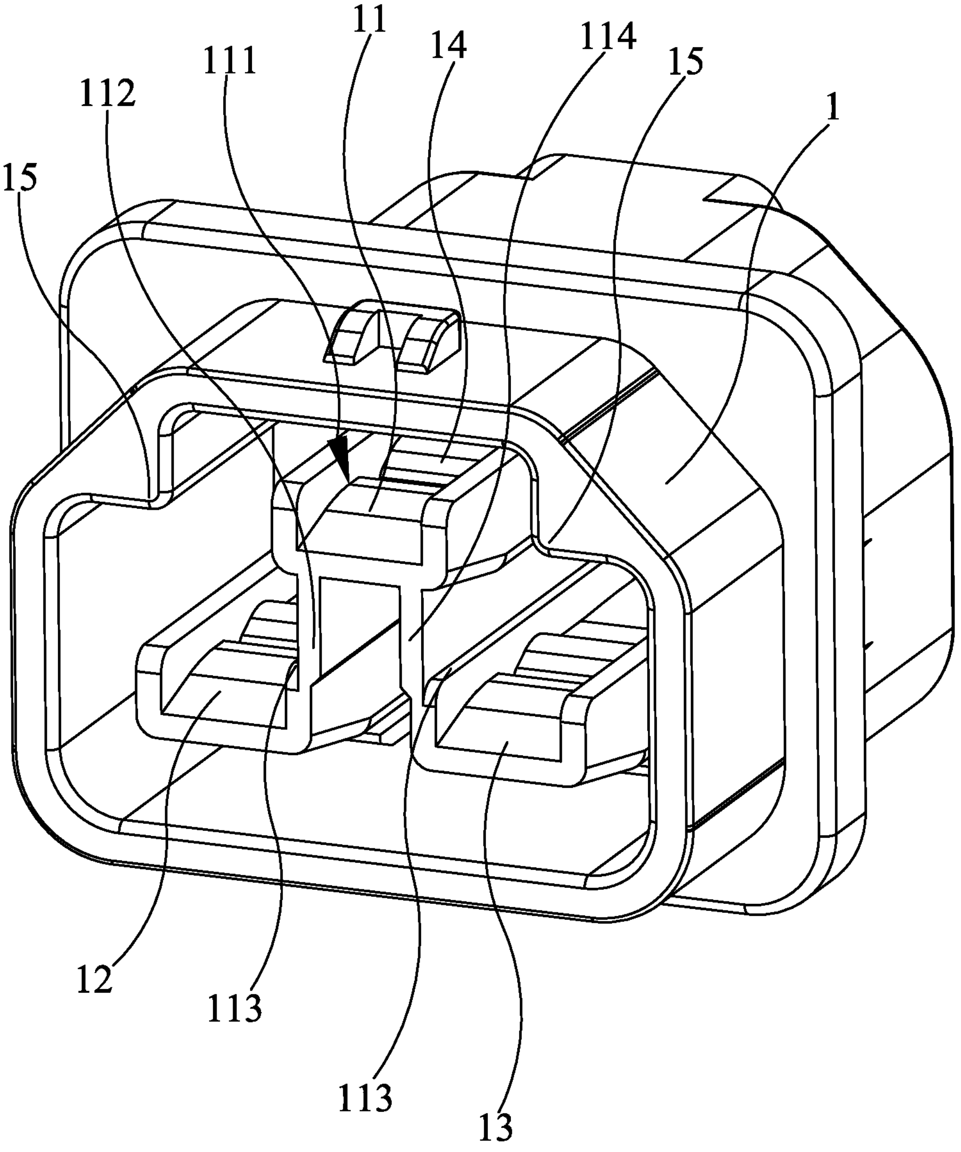
FIG. 6 is a perspective view of a third embodiment of the female connector of the present invention.

Furthermore, in order to further increase the creepage distance between the terminals, in the second embodiment of the female connector shown in FIG. 4 and the third embodiment of the female connector shown in FIG. 6, the first terminal seat 11 and the second terminal seat 12 are connected via a first partition wall 112. The first partition wall 112 closes at least one passageway 113 between the second terminal seat 12 and the third second terminal seat 13. The first partition wall 112 is configured to increase the creepage distance between the conductive terminal set 14 in the second terminal seat 12 and the conductive terminal set 14 in the third terminal seat 13. More specifically, the first partition wall 112 and the second partition wall 114 extend upward from the edges of the respective inner sides of the second terminal seat 12 and the third terminal seat 13 and are connected to the bottom of the first terminal seat 11. In the first embodiment of the female connector shown in FIG. 2 and the third embodiment of the female connector shown in FIG. 6, the first terminal seat 11 and the third terminal seat 13 are connected via a second partition wall 114. The second partition wall 114 closes at least one passageway 113 between the second terminal seat 12 and the third terminal seat 13, and further increases the creepage distance between the conductive terminal set 14 in the second terminal seat 12 and the conductive terminal set 14 in the third terminal seat 13. As shown in FIG. 6, the third embodiment of the female connector has the first partition wall 112 and the second partition wall 114.

The conductive terminal set 14 in the first terminal seat 11 corresponds to a ground end. The conductive terminal set 14 in the second terminal seat 12 corresponds to one of a live end and a neutral end. The conductive terminal set 14 in the third terminal seat 13 corresponds to the other of the live end and the neutral end.

In an embodiment, the female connector of the present invention may serve as a connector for a power supply board, and the first terminal seat 11, the second terminal seat 12 and the third terminal seat 13 do not include signal transmission terminals.

In order to prevent accidental electric shock, the top of the inner wall of the ring-shaped outer wall 1 has at least one protruding block 15. The protruding block 15 extends outward in the length direction of the ring-shaped outer wall 1 for the first terminal seat 11, the second terminal seat 12 and the third terminal seat 13 not to extend out of the ring-shaped outer wall 1, thereby reducing the risk of the user touching the terminals by mistake.

Figure 14:
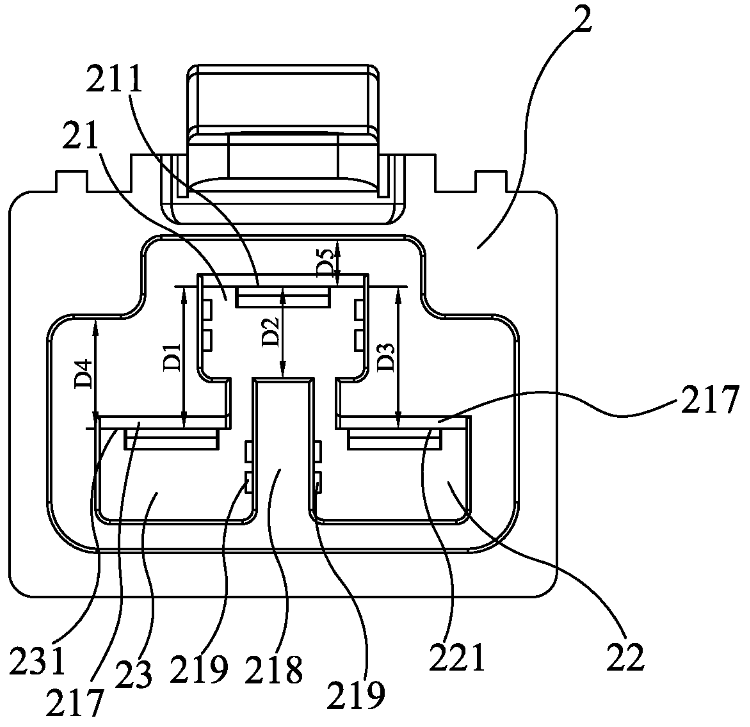
FIG. 14 is a front view of the third embodiment of the male connector of the present invention.

Referring to FIG. 1, FIG. 3, FIG. 5 and FIG. 7, the present invention further discloses a male connector, comprising a front connecting block 2. A front end surface of the front connecting block 2 includes a first terminal hole 21, a second terminal hole 22, and a third terminal hole 23. The first terminal hole 21 has a first terminal supporting surface 211. The second terminal hole 22 has a second terminal supporting surface 221. The third terminal hole 23 has a third terminal supporting surface 231. The first terminal supporting surface 211 supports a first conductive terminal set 212. The second terminal supporting surface 221 supports a second conductive terminal set 213. The third terminal supporting surface 231 supports a third conductive terminal set 214. Referring to FIG. 14, the distance D3 between the first terminal supporting surface 211 and the second terminal supporting surface 221 in the thickness direction of the front connecting block 2 is greater than the maximum inner diameter D2 of the first terminal hole 21 in the thickness direction of the front connecting block 2 for increasing the creepage distance between the terminals and ensuring that the creepage distance between the terminals is not too short.

The first terminal hole 21 and the second terminal hole 22 communicate with each other via a first passageway 215 on the front end surface. Furthermore, the first terminal hole 21 and the third terminal hole 23 communicate with each other via a second passageway 216 on the front end surface. The distance D1 between the first terminal supporting surface 211 and the third terminal supporting surface 231 in the thickness direction of the front connecting block 2 is greater than the maximum inner diameter D2 of the first terminal hole 21 in the thickness direction of the front connecting block 2. The first passageway 215 communicates with the first terminal hole 21 via the second terminal supporting surface 221. The second passageway 216 communicates with the third terminal hole 23 via the third terminal supporting surface 231.

Further, in order to enhance the strength of the male connector of the present invention, each of the second terminal supporting surface 221 and the third terminal supporting surface 231 is provided with a thickened wall 217. The material thickness D4 of the thickened wall 217 in the thickness direction of the front connecting block 2 is greater than the material thickness D5 of the first terminal supporting surface 211 in the thickness direction of the front connecting block 2.

The end surfaces of the first terminal hole 21, the second terminal hole 22 and the third terminal hole 23 are substantially the same in shape, and they are all rectangular and arranged in trefoil formation. That is to say, the first terminal hole 21 is arranged above the second terminal hole 22 and the third terminal hole 23, and the first terminal hole 21, the second terminal hole 22 and the third terminal hole 23 are evenly spaced. The first terminal hole 21, the second terminal hole 22 and the third terminal hole 23 have a difference in area on the front end surface by less than 10%.

Further, the second terminal hole 22 and the third terminal hole 23 are separated by a barrier wall 218. The barrier wall 218 does not extend into the first terminal hole 21 and is not provided with a conductive terminal set on its surface.

In addition, referring to FIG. 14, in order to facilitate the female connector of the present invention to be coupled with the male connector of the present invention, at least one inner side wall of the first terminal hole 21, the second terminal hole 22 or the third terminal hole has at least one guide bar 219. The guide bar 219 extends in the length direction of the male connector. Therefore, the first terminal seat 11, the second terminal seat 12 or the third terminal seat 13 is inserted into the corresponding first terminal hole 21, the second terminal hole 22 or the third terminal hole 23 along the direction of the guide bar 219, so that the assembly of the female connector and the male connector of the present invention is easy.

Figure 11:
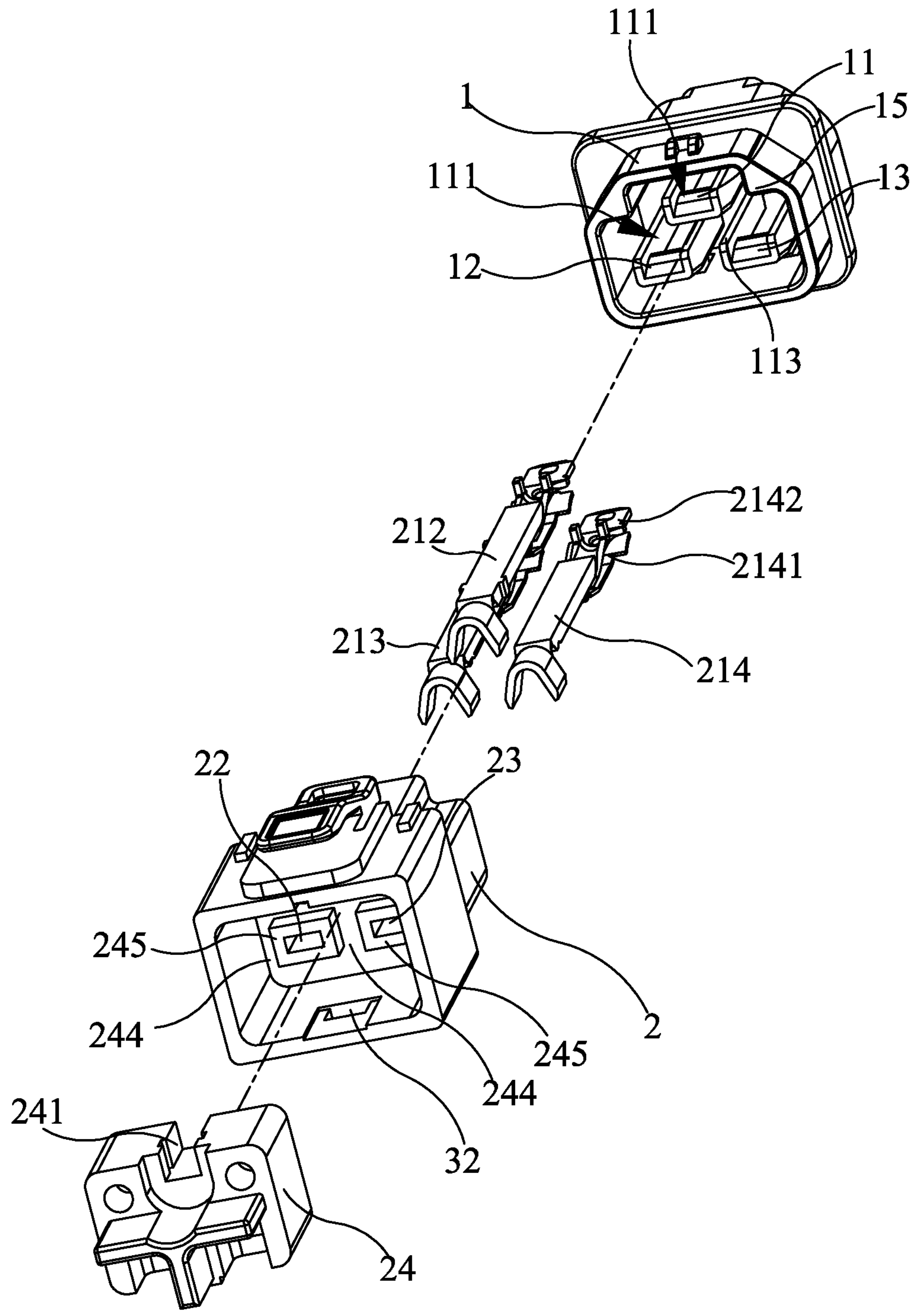
FIG. 11 is a first exploded view of the fourth embodiment of the male connector and the fourth embodiment of the female connector of the present invention.
Figure 12:
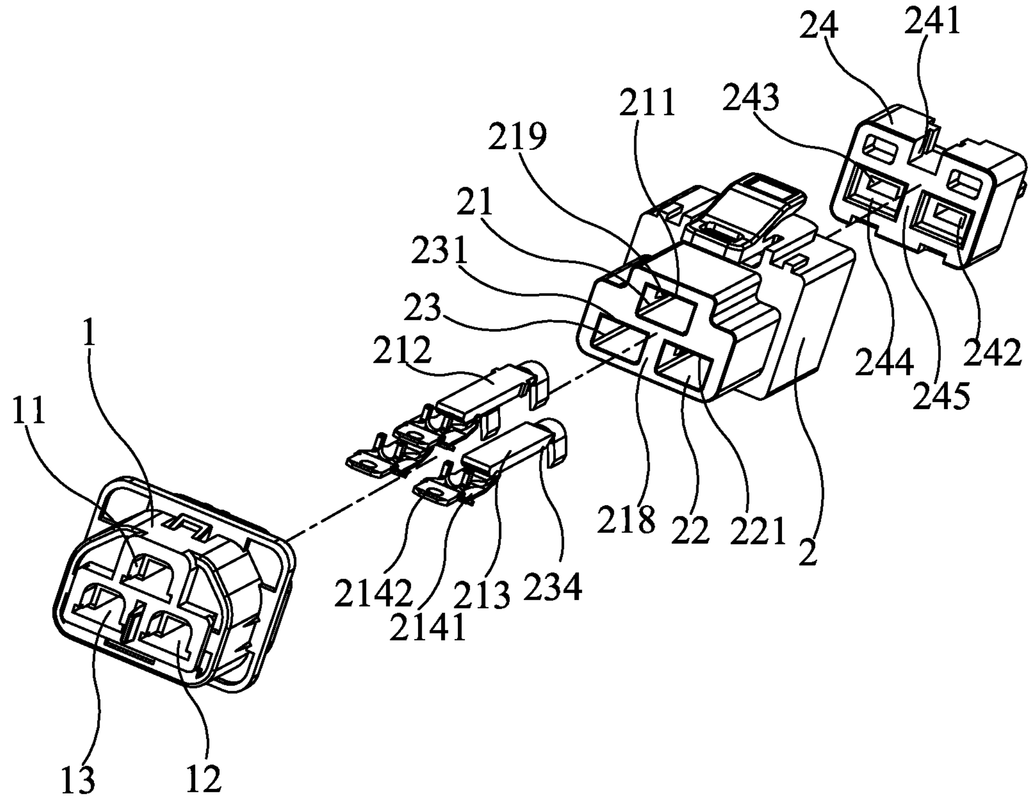
FIG. 12 is a second exploded view of the fourth embodiment of the male connector and the fourth embodiment of the female connector of the present invention.
Figure 13:
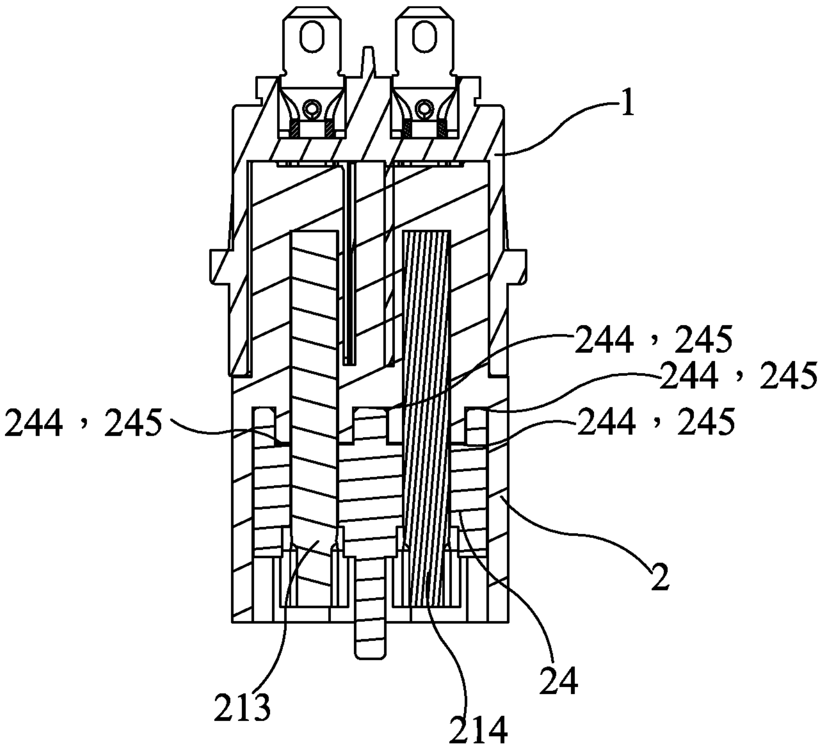
FIG. 13 is a cross-sectional view of the first to fourth embodiments of the male connector and the female connector of the present invention after being assembled.

Further, referring to FIG. 11 and FIG. 12, the male connector of the present invention further comprises an inner insert 24. The inner insert 24 is inserted into the front connecting block 2 from the other direction opposite to the front end surface. A terminal passageway 241 is defined between the outer side of the inner insert 24 and the front connecting block 2. The first conductive terminal set 212 enters the first terminal hole 21 via the terminal passageway 241. The inner insert 24 has a first through hole 242 and a second through hole 243. The second conductive terminal set 213 enters the second terminal hole 22 via the first through hole 242. The third conductive terminal set 214 enters the third terminal hole 23 via the second through hole 243. The arrangement of the inner insert 24 facilitates the assembly of the first conductive terminal set 212, the second conductive terminal set 213 and the third conductive terminal set 214. As shown in FIG. 11 and FIG. 12, the first conductive terminal set 212, the second conductive terminal set 213 and the third conductive terminal set 214 each include an elastic plate 2141 (or called flat spring) and a terminal 2142 that are connected to each other. The terminal 2142 is supported on an inner side surface of each of the first terminal hole 21, the second terminal hole 22 and the third terminal hole 23 via the elastic sheet 2141. Therefore, the elastic sheet 2141 facilitates the quality of contact and electrical connection.

The first conductive terminal set 212 corresponds to a ground end (G/GND). The second conductive terminal set 213 corresponds to one of a live end (L) and a neutral end (N). The third conductive terminal set 214 corresponds to the other of the live end and the neutral end.

In addition, in order to facilitate the assembly of the inner insert 24 and the front connecting block 2, the inner insert 24 and the front connecting block 2 are connected together in a snap-fit manner via the engagement of a locking block 31 and a locking hole 32. The undersides of the second conductive terminal set 213 and the third conductive terminal set 214 have terminal engaging grooves 234. The respective bottom surfaces of the first terminal hole 21 and the second terminal hole 22 are formed with ribs. The ribs are engaged with the terminal engaging grooves 234, respectively. When the male connector of the present invention is made of a plastic material, the ribs do not need to be specially shaped. When the bottom surfaces of the first terminal hole 21 and the second terminal hole 22 are pressed to approach the terminal engaging grooves 234, they will be deformed to form the ribs, but not limited to this. The ribs may be directly formed on the bottom surfaces of the first terminal hole 21 and the second terminal hole 22 when the male terminal of the present invention is formed and manufactured. Thus, the engagement of the terminal engaging grooves 234 and the ribs can prevent the second conductive terminal set 213 and the third conductive terminal set 214 from being retreated after assembly.

Further, in order to further increase the creepage distance, the connecting end surfaces of the front connecting block 2 and the inner insert 24 are tightly connected via a mating structure in which a concave portion 244 is engaged with a convex portion 245. The second conductive terminal set 213 and the third conductive terminal set 214 are separated by the mating structure in which the concave portion 244 is engaged with the convex portion 245. The male connector of the present invention performs creepage along the track where the concave portion 244 and the convex portion 245 are engaged and connected. The concave portion 244 and the convex portion 245 further facilitate the alignment and installation of the inner insert 24 and the front connecting block 2.

The embodiments shown in FIG. 1, FIG. 3, FIG. 5 and FIG. 7 are different. In the first embodiment of the male connector shown in FIG. 1, the first terminal hole 21 communicates with the third terminal hole 23 and does not communicate with the second terminal hole 22. In the second embodiment of the male connector shown in FIG. 3, the first terminal hole 21 communicates with the second terminal hole 22 and does not communicate with the third terminal hole 23. In the third embodiment of the male connector shown in FIG. 5, the first terminal hole 21 communicates with the second terminal hole 22 and the third terminal hole 23. In the fourth embodiment of the male connector shown in FIG. 7, the first terminal hole 21 does not communicate with the second terminal hole 22 and the third terminal hole 23.

Figure 2:
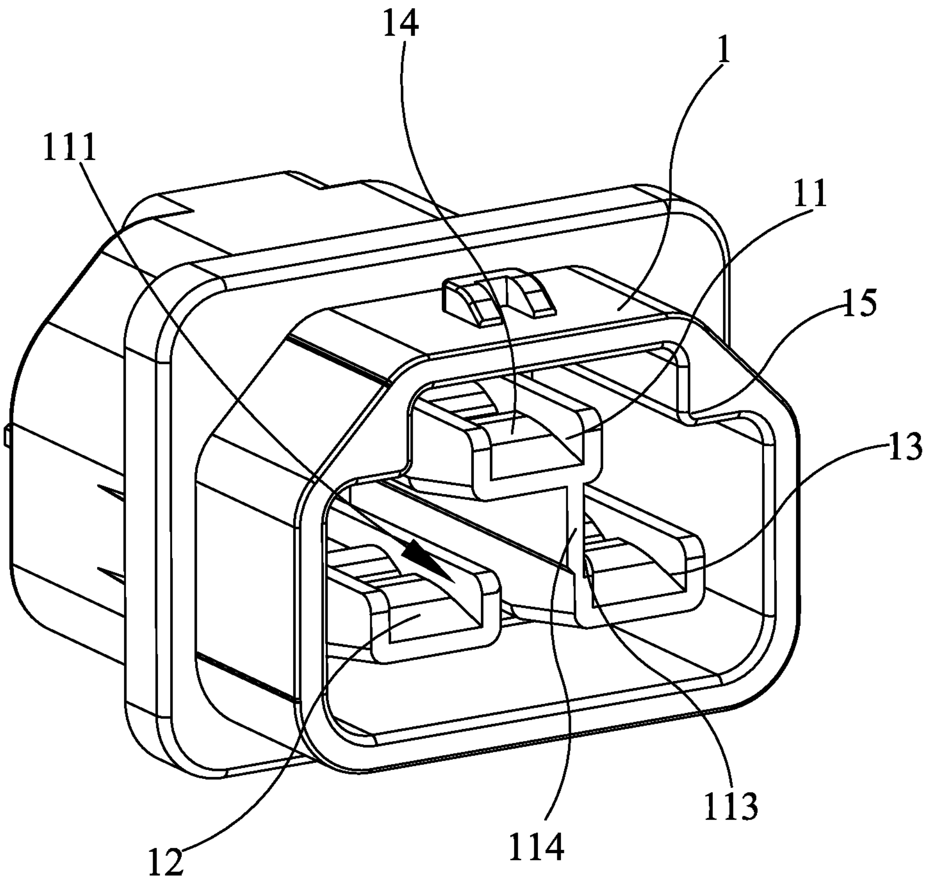
FIG. 2 is a perspective view of a first embodiment of the female connector of the present invention.
Figure 3:
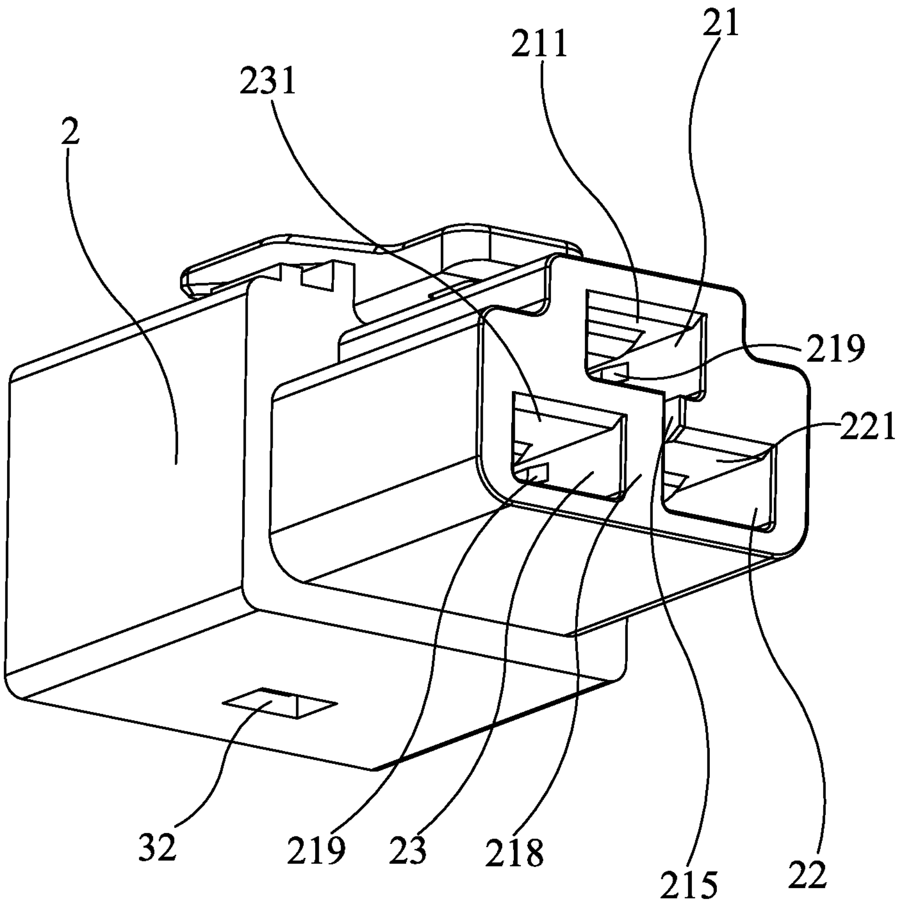
FIG. 3 is a perspective view of a second embodiment of the male connector of the present invention.
Figure 5:
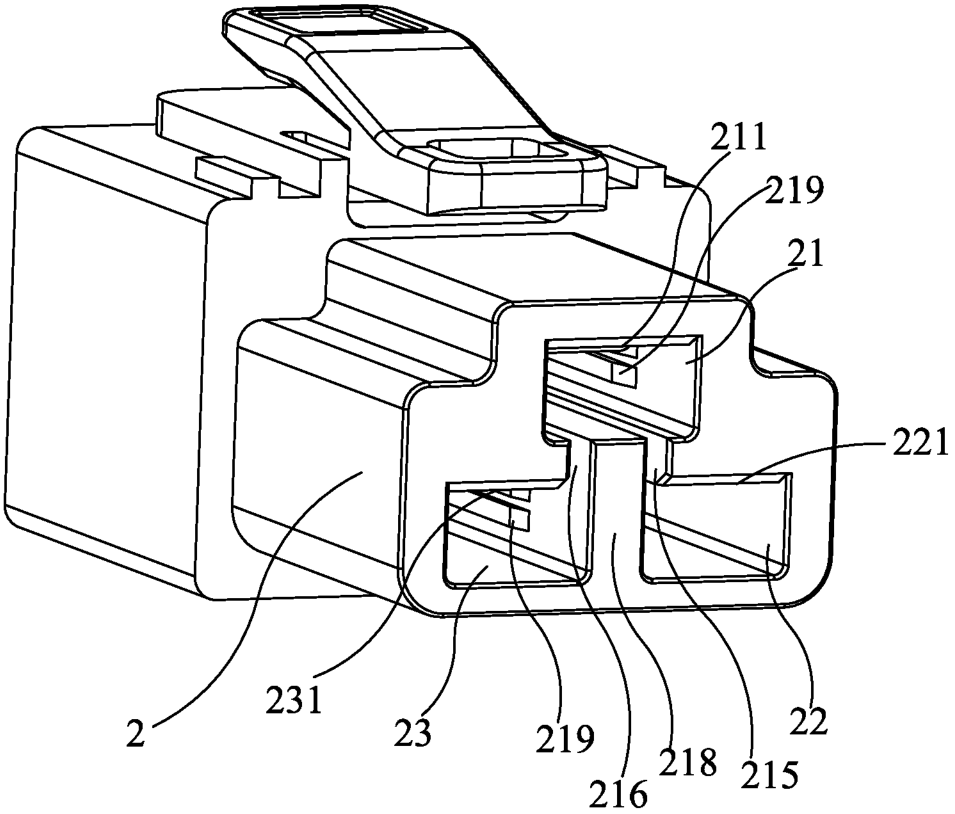
FIG. 5 is a perspective view of a third embodiment of the male connector of the present invention.
Figure 7:
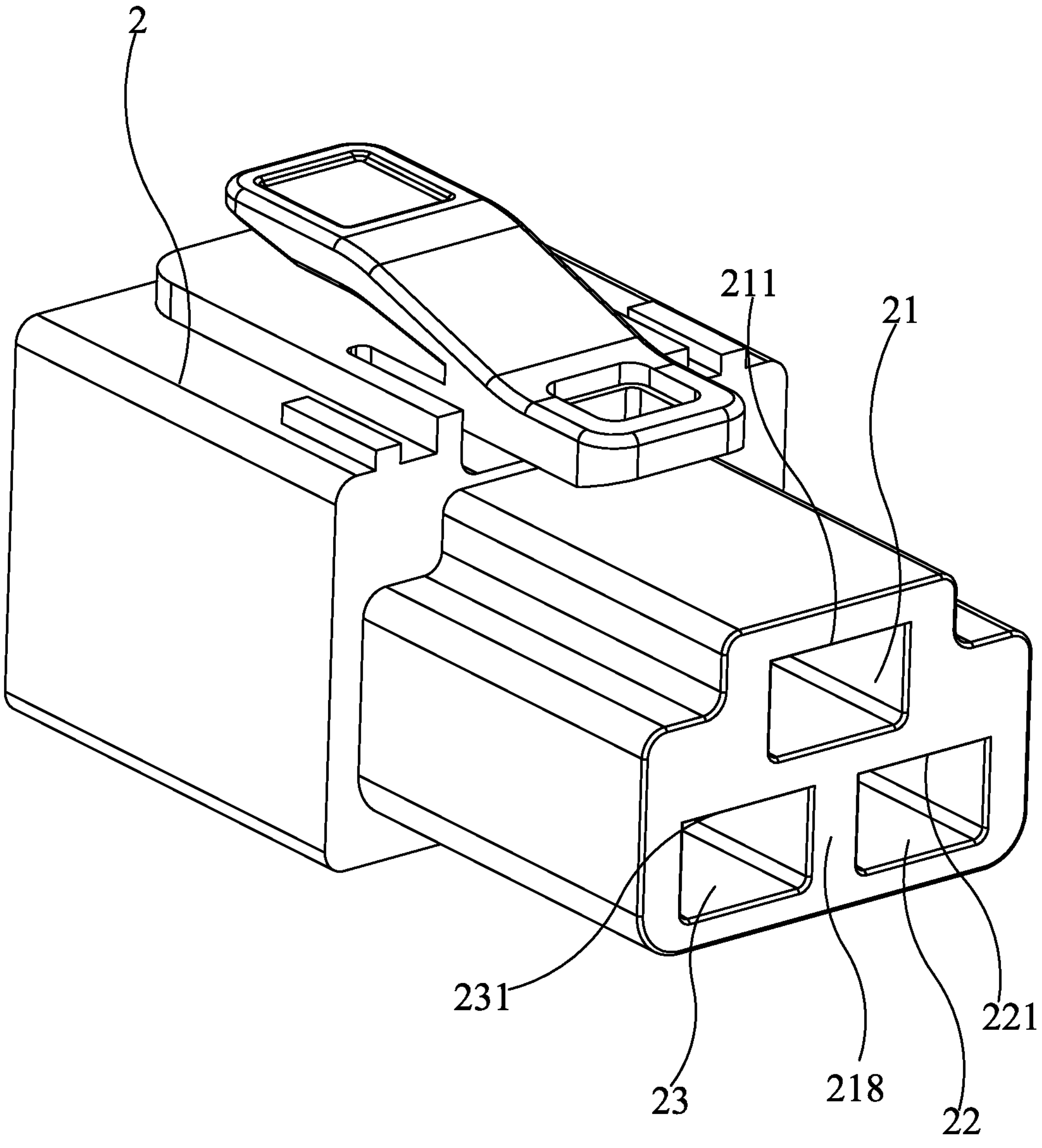
FIG. 7 is a perspective view of a fourth embodiment of the male connector of the present invention.
Figure 8:
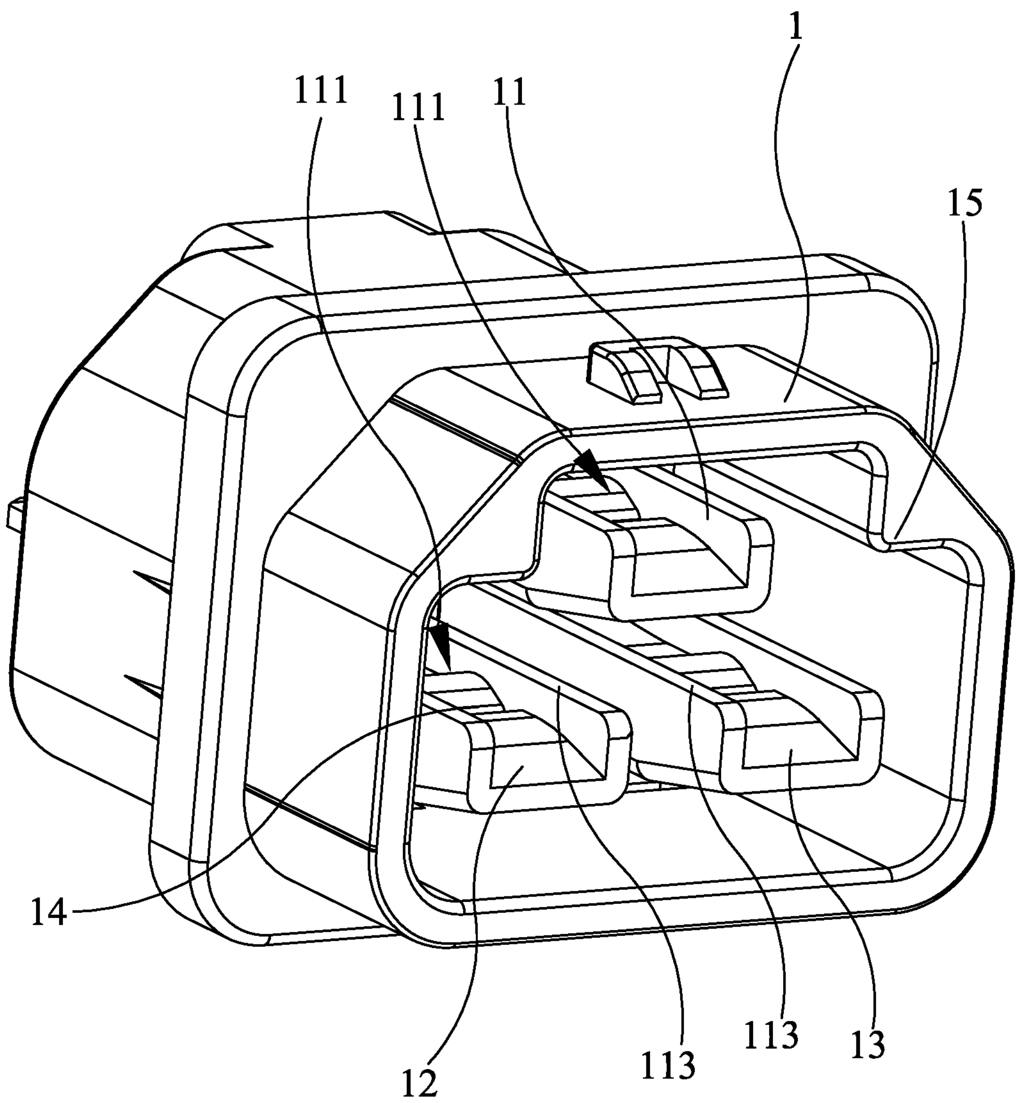
FIG. 8 is a perspective view of a fourth embodiment of the female connector of the present invention.
Figure 9:
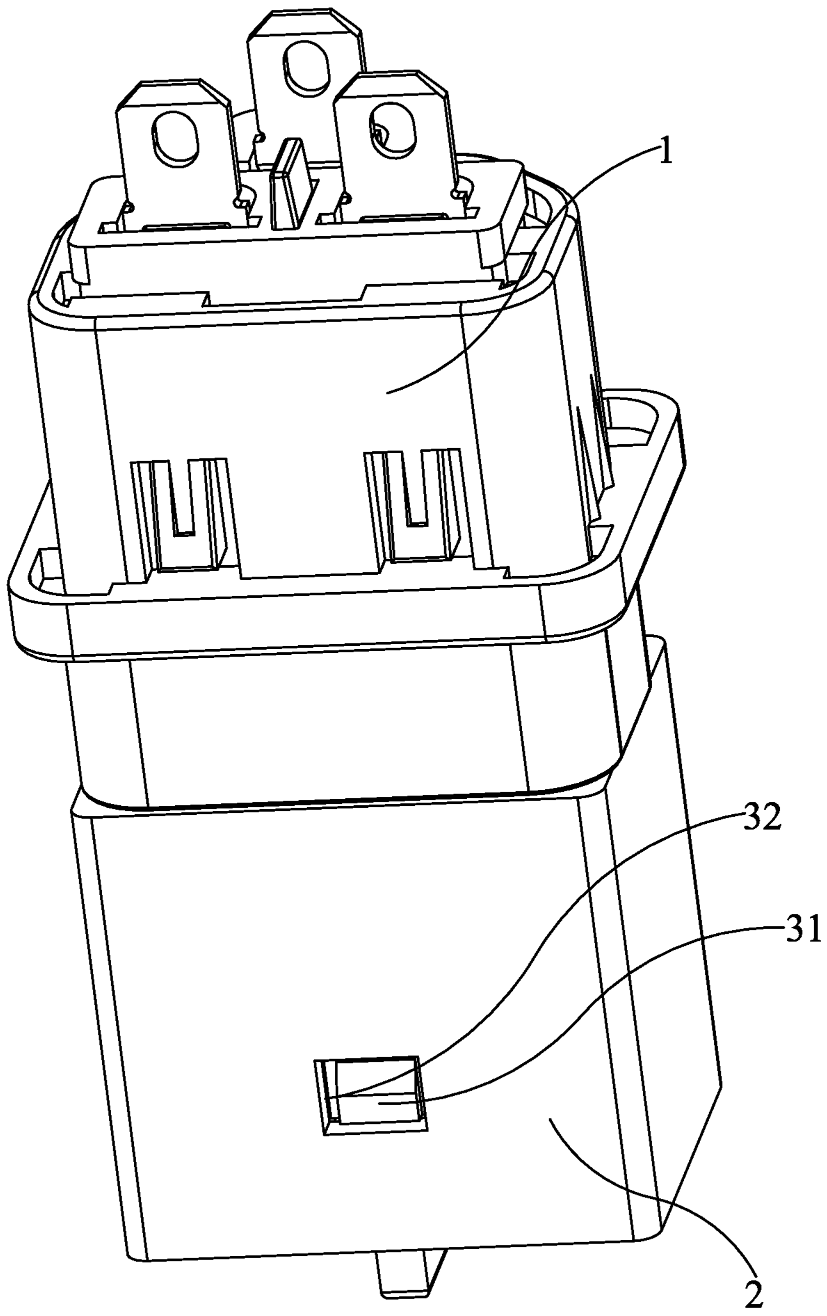
FIG. 9 is a first perspective view of the first to fourth embodiments of the male connector and the female connector of the present invention after being assembled.
Figure 10:
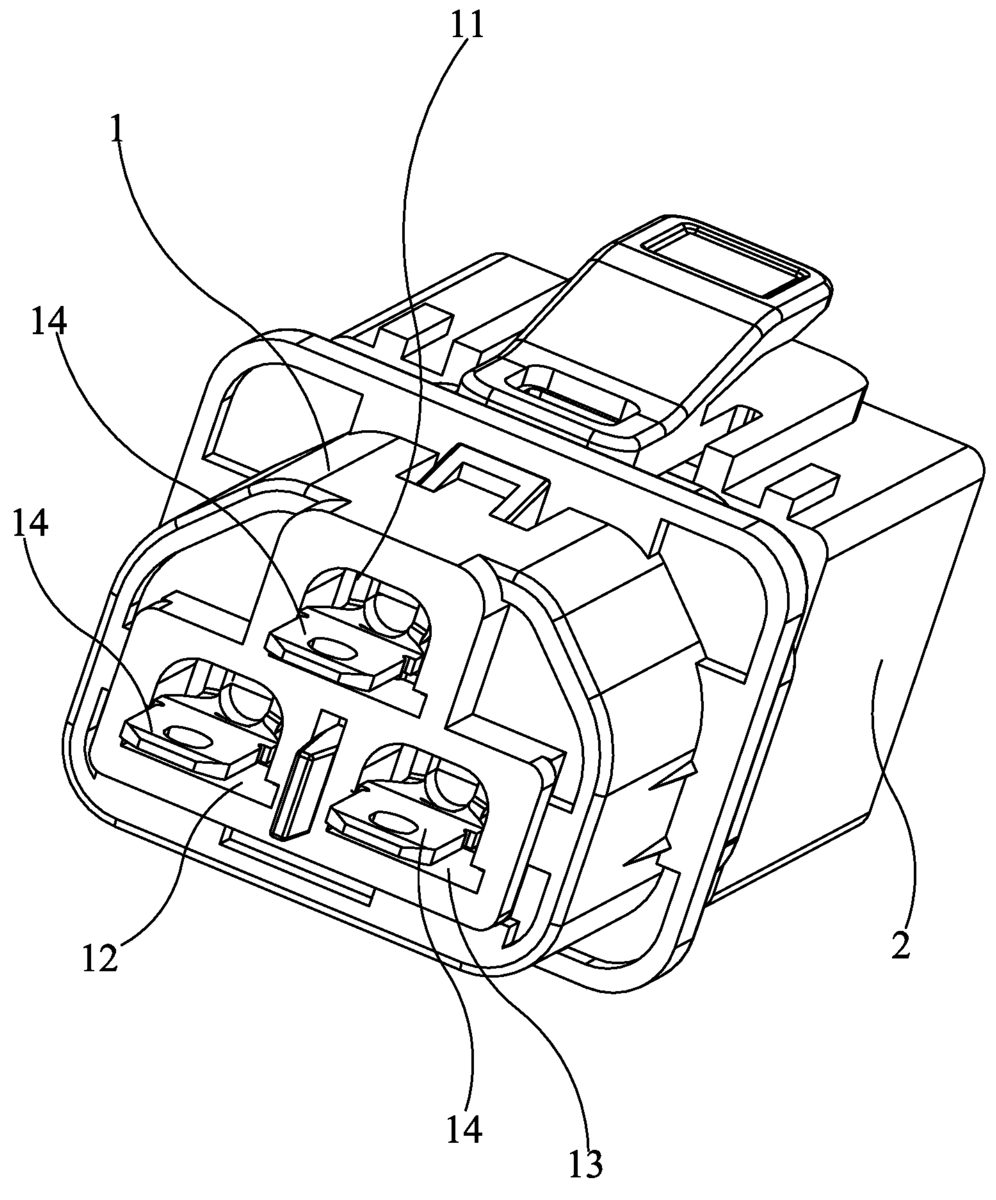
FIG. 10 is a second perspective view of the first to fourth embodiments of the male connector and the female connector of the present invention after being assembled.

Furthermore, the first embodiment of the male connector of the present invention shown in FIG. 1 is matched and assembled with the first embodiment of the female connector of the present invention shown in FIG. 2. The second embodiment of the male connector of the present invention shown in FIG. 3 is matched and assembled with the second embodiment of the female connector of the present invention shown in FIG. 4. The third embodiment of the male connector of the present invention shown in FIG. 5 is matched and assembled with the third embodiment of the female connector of the present invention shown in FIG. 6. The fourth embodiment of the male connector of the present invention shown in FIG. 7 is matched and assembled with the fourth embodiment of the female connector of the present invention shown in FIG. 8. The third embodiment of the female connector of the present invention shown in FIG. 6 cannot be assembled with the fourth embodiment of the male connector of the present invention shown in FIG. 7. That is, when the female connector of the present invention has the first partition wall 112 or/and the second partition wall 114, the male connector of the present invention needs to have the first passageway 215 or/and the second passageway 216.

The present invention further discloses a male connector, comprising a front connecting block 2. A front end surface of the front connecting block 2 includes a first terminal hole 21, a second terminal hole 22, and a third terminal hole 23. The first terminal hole 21 has a first terminal supporting surface 211. The second terminal hole 22 has a second terminal supporting surface 221. The third terminal hole 23 has a third terminal supporting surface 231. The first terminal supporting surface 211 supports a first conductive terminal set 212. The second terminal supporting surface 221 supports a second conductive terminal set 213. The third terminal supporting surface 231 supports a third conductive terminal set 214. The undersides of the second conductive terminal set 213 and the third conductive terminal set 214 have terminal engaging grooves 234. The respective bottom surfaces of the first terminal hole 21 and the second terminal hole 22 are formed with ribs. The ribs are engaged with the terminal engaging grooves 234, respectively, which can prevent the second conductive terminal set 213 and the third conductive terminal set 214 from being retreated after assembly.

Figure 15:
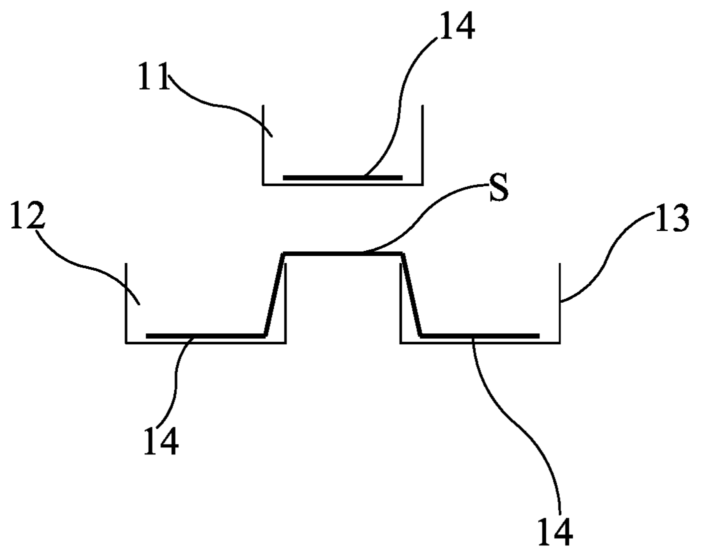
FIG. 15 is a schematic view of the creepage distance of the fourth embodiment of the female connector of the present invention.
Figure 16:
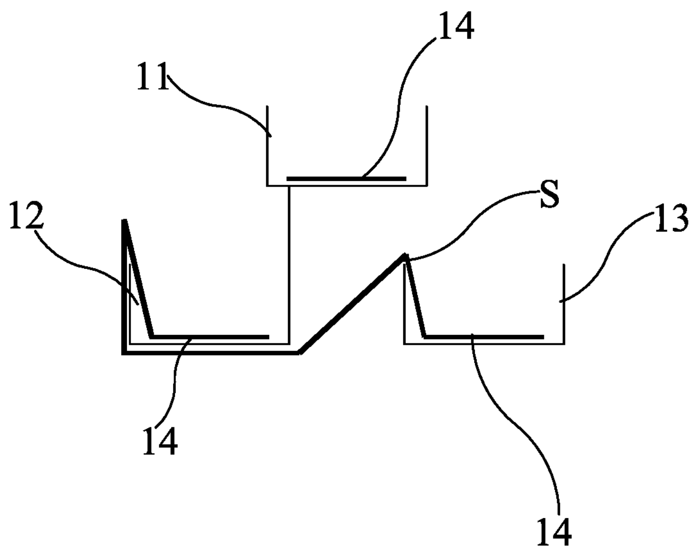
FIG. 16 is a schematic view of the creepage distance of the second embodiment of the female connector of the present invention.
Figure 17:
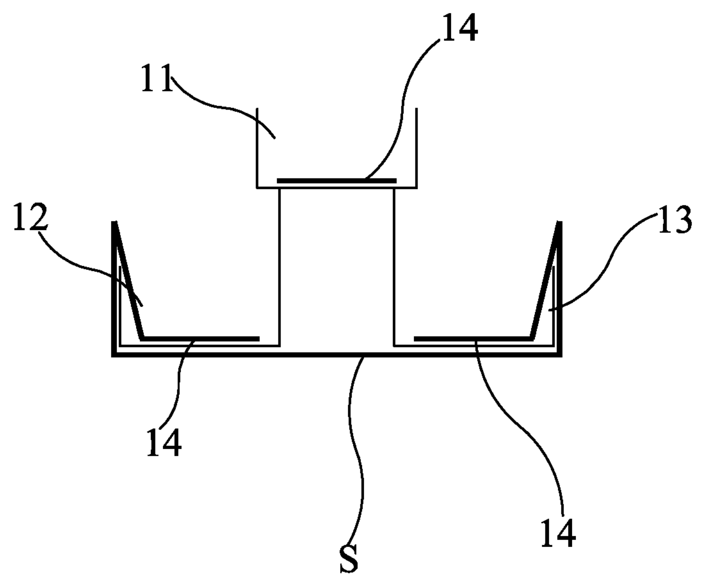
FIG. 17 is a schematic view of the creepage distance of the third embodiment of the female connector of the present invention.
Figure 18:
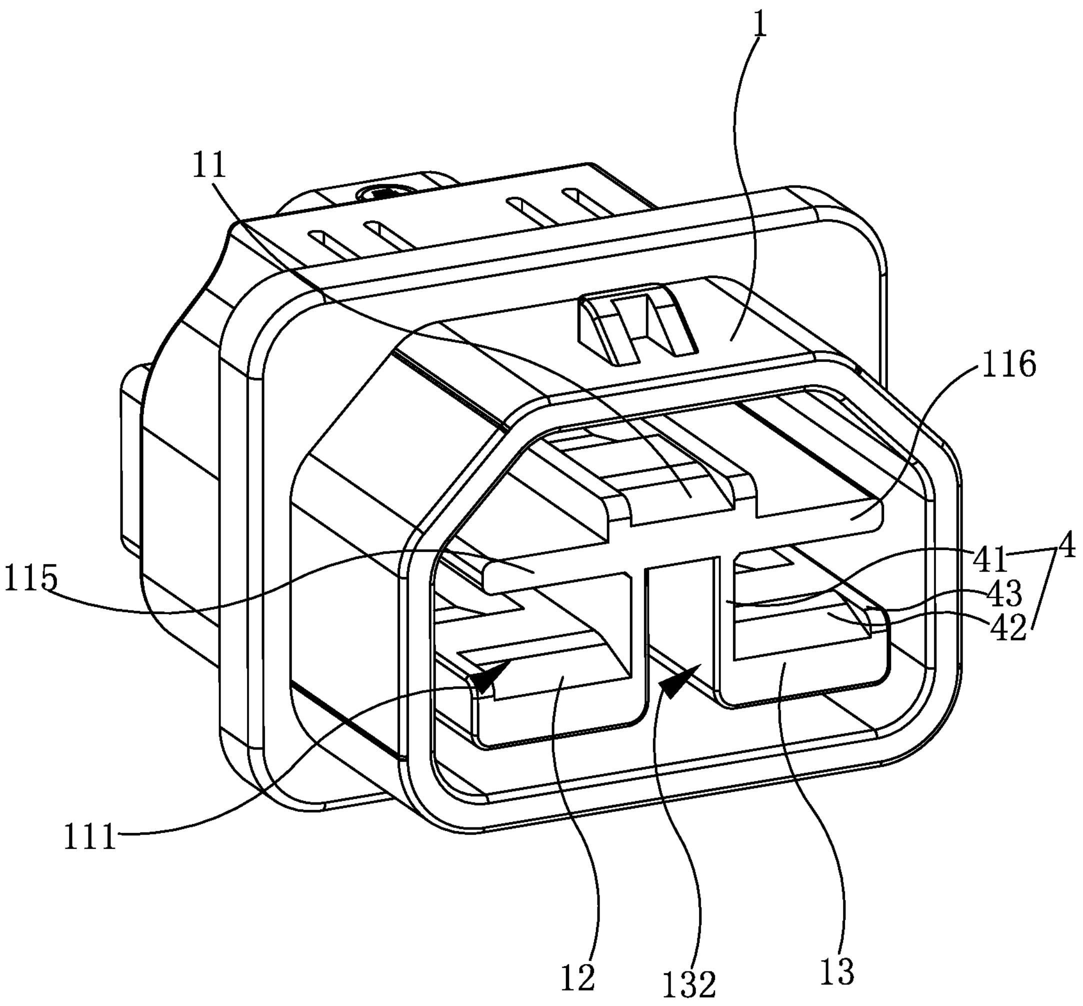
FIG. 18 is a first partial perspective view of a fifth embodiment of the female connector of the present invention.
Figure 19:
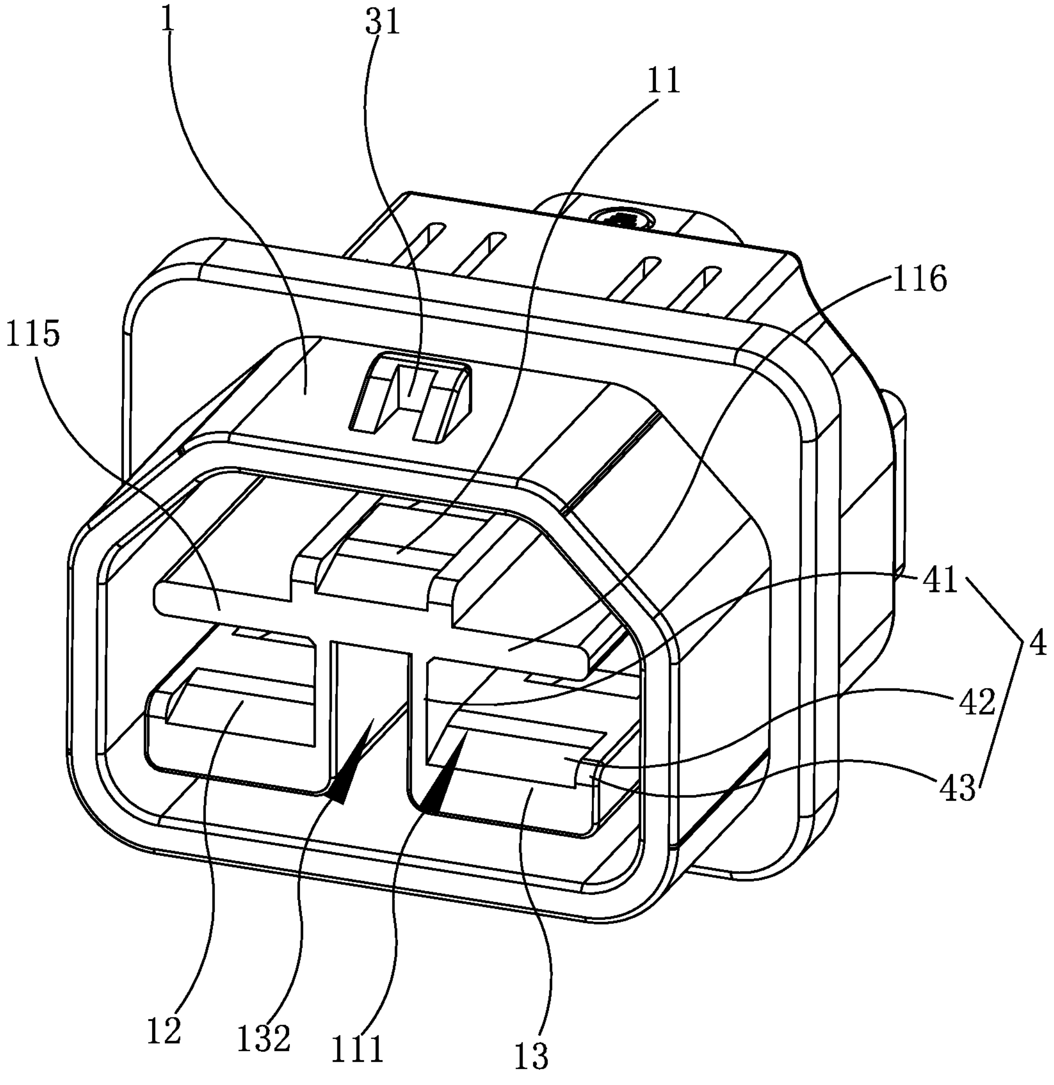
FIG. 19 is a second partial perspective view of the fifth embodiment of the female connector of the present invention.

To sum up, the present invention can achieve the following effects:

(1) As shown in FIG. 15 and FIG. 17, in the female connector of the present invention, the contours of the end surfaces of the first terminal seat 11, the second terminal seat 12 and the third terminal seat 13 are designed to have a cup shape for the conductive terminal set 14 of the first terminal seat 11, the conductive terminal set 14 of the second terminal seat 12 and the conductive terminal set 14 of the third terminal seat 13 to form blocking walls on both sides, so as to increase the creepage distance S.

(2) The female connector of the present invention has the first partition wall 112 to increase the creepage distance between the conductive terminal set 14 in the second terminal seat 12 and the conductive terminal set 14 in the third terminal seat 13.

(3) The female connector of the present invention has the second partition wall 114 to increase the creepage distance between the conductive terminal set 14 in the second terminal seat 12 and the conductive terminal set 14 in the third terminal seat 13.

(4) In the male connector of the present invention, the distance D3 between the first terminal supporting surface 211 and the second terminal supporting surface 221 in the thickness direction of the front connecting block 2 is greater than the maximum inner diameter D2 of the first terminal hole 21 in the thickness direction of the front connecting block 2, so as to increase the creepage distance.

(5) In the male connector of the present invention, the distance D1 between the first terminal supporting surface 211 and the third terminal supporting surface 231 in the thickness direction of the front connecting block 2 is greater than the maximum inner diameter D2 of the first terminal hole 21 in the thickness direction of the front connecting block 2, which further increases the creepage distance.

(6) In the male connector of the present invention, each of the second terminal supporting surface 221 and the third terminal supporting surface 231 is provided with the thickened wall 217. The material thickness D4 of the thickened wall 217 in the thickness direction of the front connecting block 2 is greater than the material thickness D5 of the first terminal supporting surface 211 in the thickness direction of the front connecting block 2, so as to increase the thickness of the separation between the first terminal hole 21, the second terminal hole 22 and the third terminal hole 23. Thus, it is not easy to be broken and the strength is improved.

In addition, please refer to the fifth embodiment of the female connector of the present invention shown in FIGS. 18 to 19 and FIGS. 23 to 27 and the third embodiment of the female connector of the present invention shown in FIG. 6. The first terminal seat 11 has an inverted Π shape. The main difference between them is that there is no protruding block 15 in the fifth embodiment of the female connector of the present invention. A first extension partition plate 115 is provided on one side of the first terminal seat 11, adjacent to the second terminal seat 12. A second extension partition plate 116 is provided on the other side of the first terminal seat 11, adjacent to the third terminal seat 13. The side wall of the second terminal seat 12, adjacent to the third terminal seat 13, and the side wall of the third terminal base 13, adjacent to the second terminal seat 12, are integrally formed with the first terminal seat 11 to form the first partition wall 112 and the second partition wall 114. In the fifth embodiment of the female connector of the present invention, the first terminal seat 11 is a ground terminal seat, the second terminal seat 12 is a live terminal seat, and the third terminal seat 13 is a neutral terminal seat. In order to facilitate the manufacturing and molding of the female connector of the present invention, each of the second terminal seat 12 and the third terminal seat 13 is integrally formed by a high side plate 41, a bottom plate 42 and a low side plate 43. Both the high side plate 41 of the second terminal seat 12 and the high side plate 41 of the third terminal seat 13 are integrally formed with the underside of the first terminal seat 11. The high side plate 41, the bottom plate 42 and the low side plate are the three flat plates 4 mentioned above.

Figure 20:
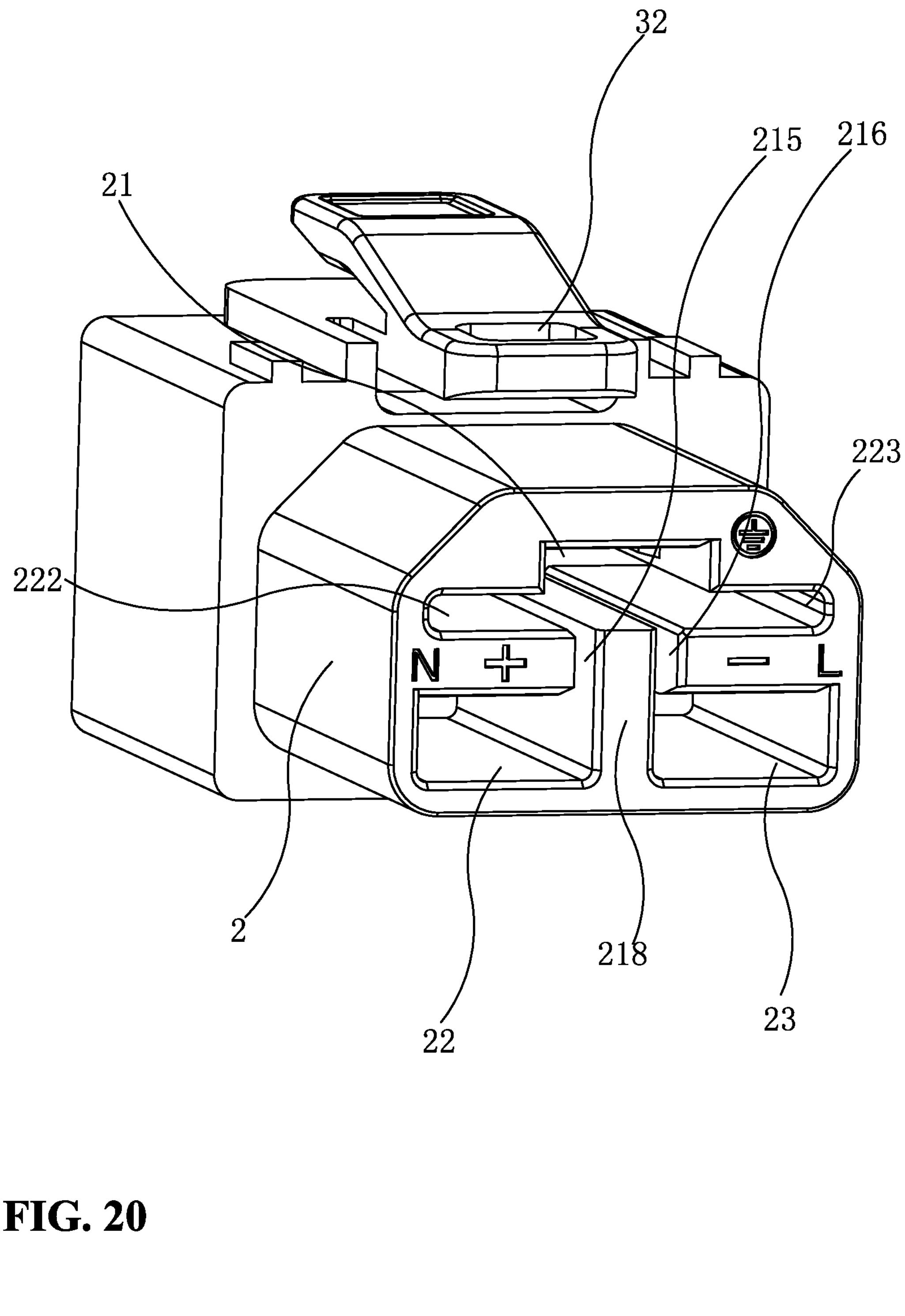
FIG. 20 is a first partial perspective view of a fifth embodiment of the male connector of the present invention.
Figure 21:
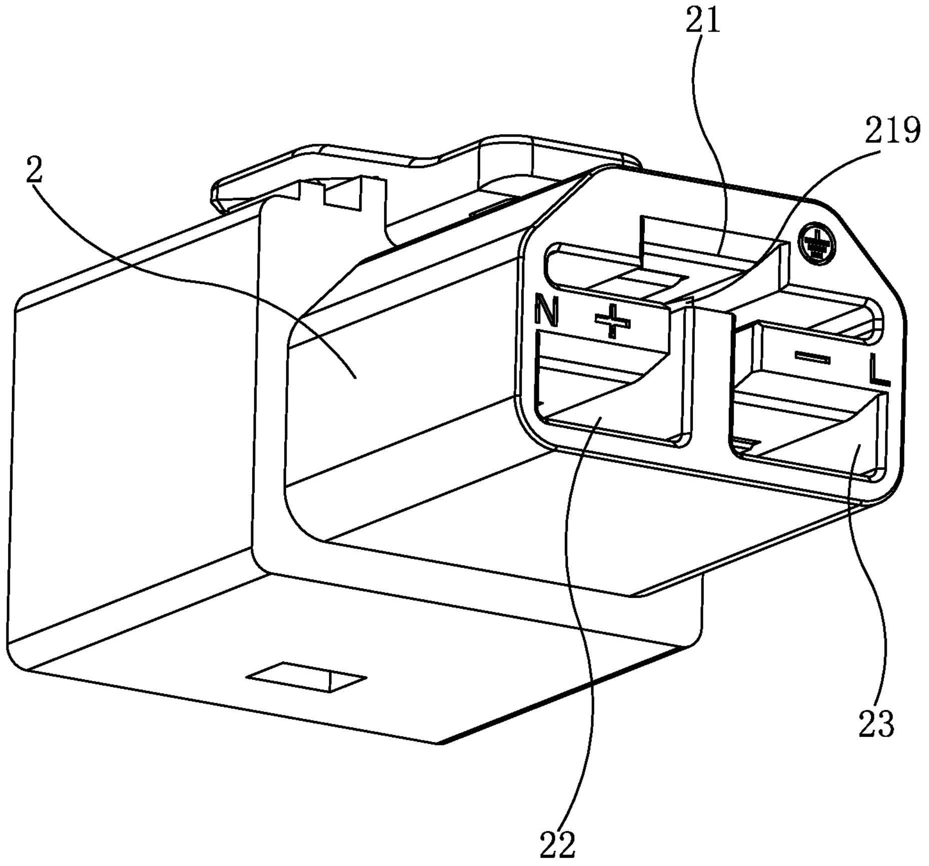
FIG. 21 is a second partial perspective view of the fifth embodiment of the male connector of the present invention.
Figure 22:
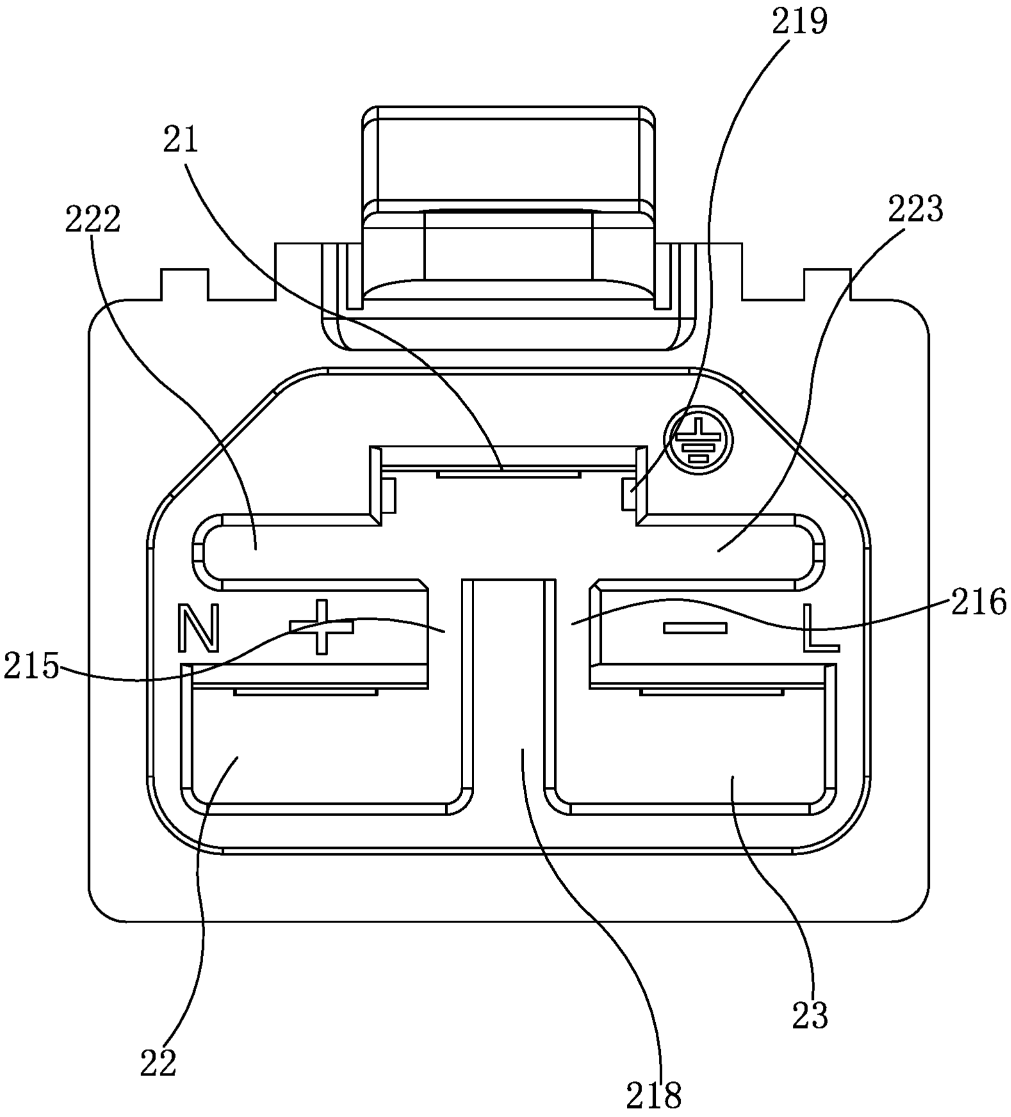
FIG. 22 is a partial front view of the fifth embodiment of the male connector of the present invention.
Figure 23:
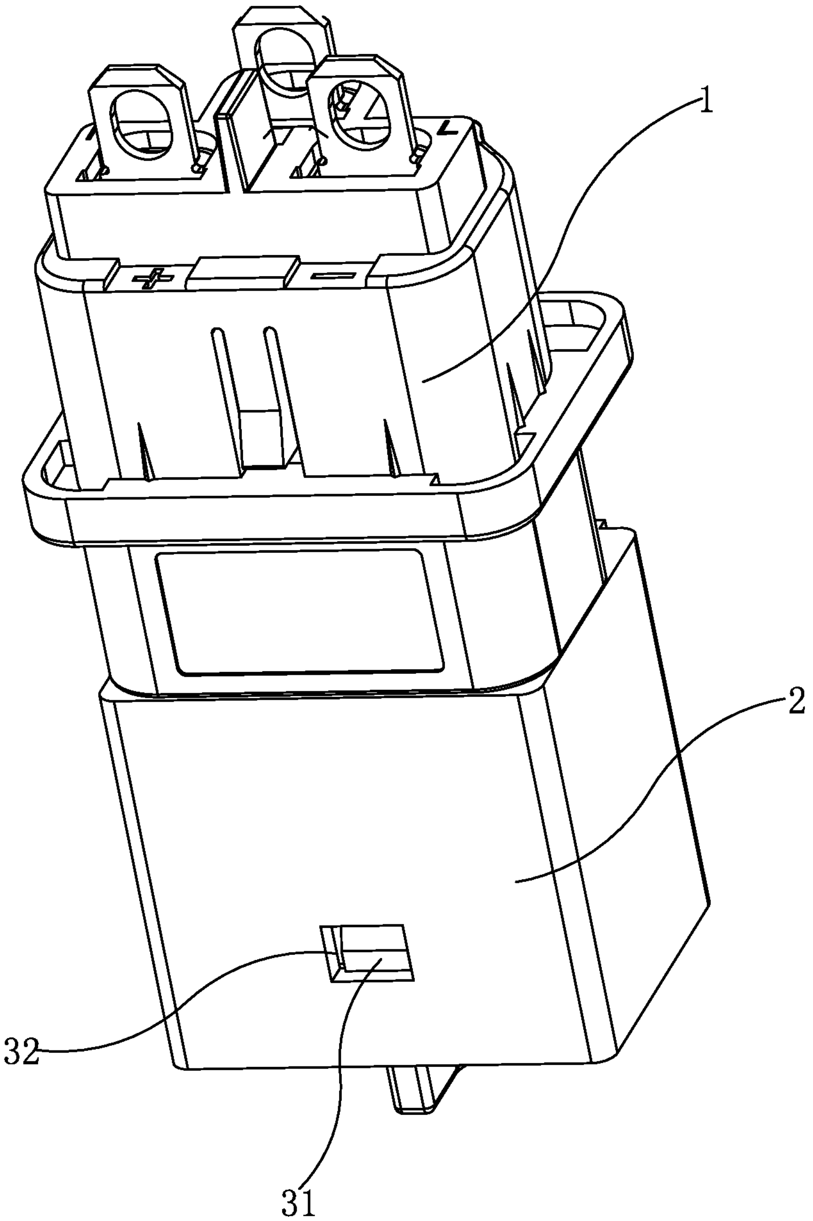
FIG. 23 is a first perspective view of the fifth embodiments of the female connector and the male connector of the present invention after being assembled.
Figure 24:
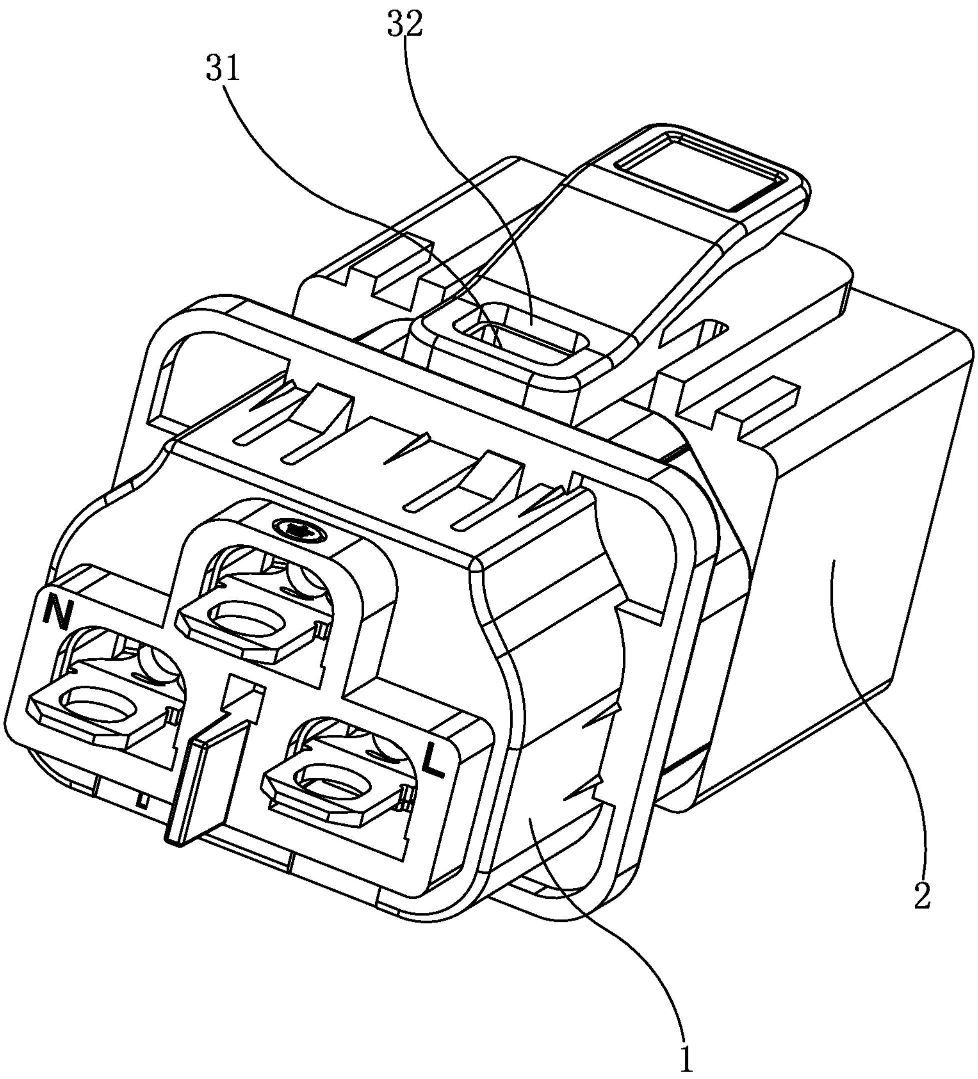
FIG. 24 is a second perspective view of the fifth embodiments of the female connector and the male connector of the present invention after being assembled.
Figure 25:
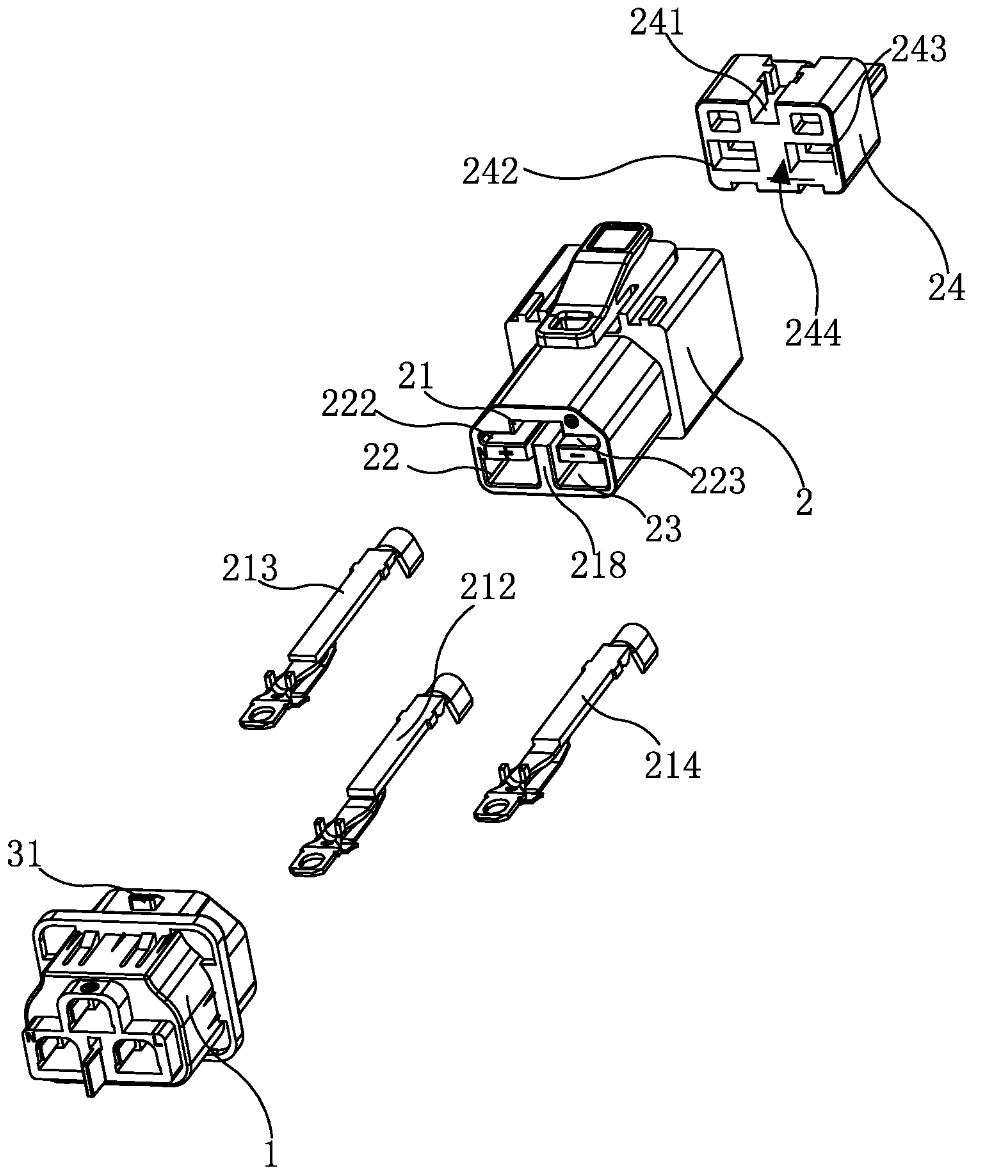
FIG. 25 is a first exploded view of the fifth embodiments of the female connector and the male connector of the present invention after being assembled.
Figure 26:
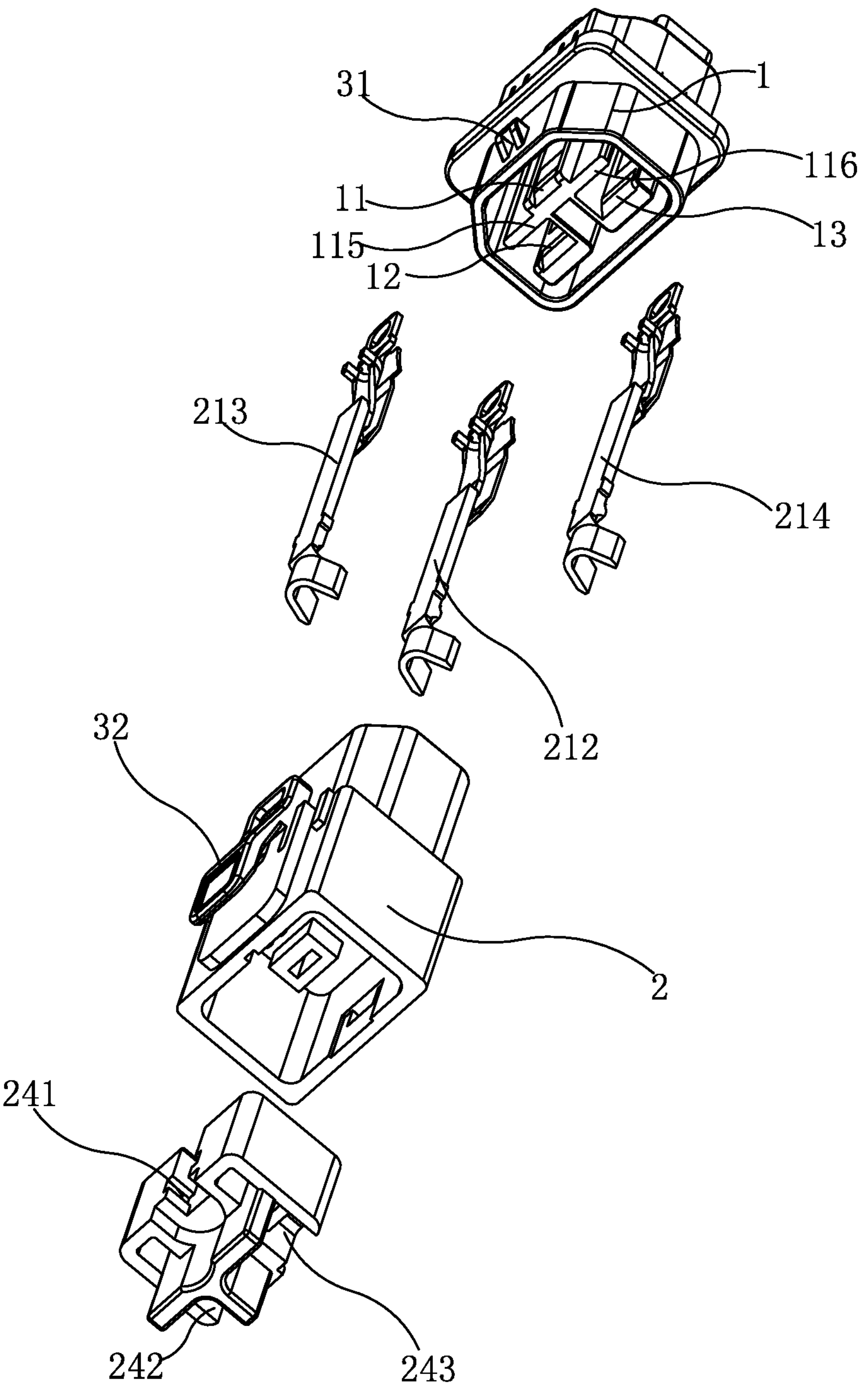
FIG. 26 is a second exploded view of the fifth embodiments of the female connector and the male connector of the present invention after being assembled.
Figure 27:
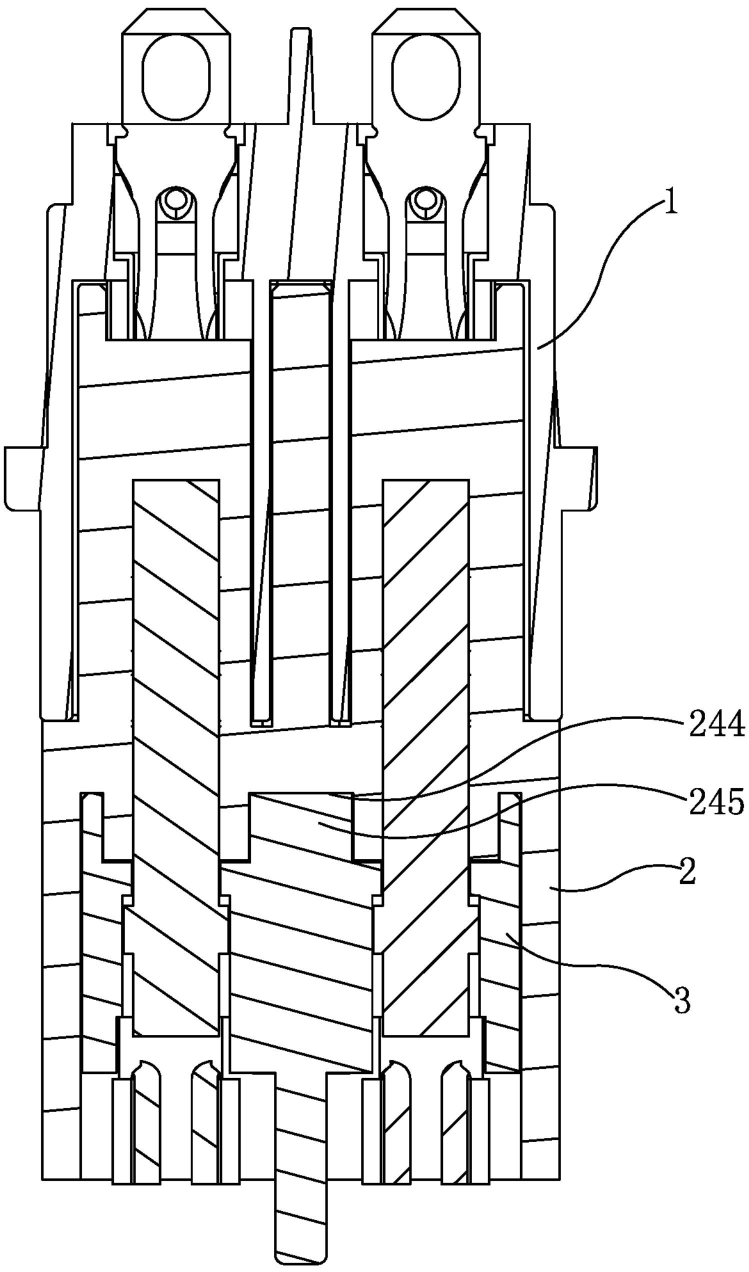
FIG. 27 is a cross-sectional view of the fifth embodiments of the female connector and the male connector of the present invention after being assembled.

Please refer to the fifth embodiment of the male connector of the present invention shown in FIGS. 20 to 22 and FIGS.

23 to 27 and the third embodiment of the male connector of the present invention shown in FIG. 5. A barrier wall 218 between the second terminal hole 22 and the third terminal hole 23 is inserted into a space 132 between the second terminal seat 12 and the third terminal seat 13. One side of the second terminal hole 22, adjacent to the third terminal hole 23, is in communication with the first terminal hole 21 via a first passageway 215. One side of the third terminal hole 23, adjacent to the second terminal hole 22, is in communication with the first terminal hole 21 via a second passageway 216. The main difference between them is that both sides of the first terminal hole 21 communicate with a first extension hole 222 and a second extension hole 223, respectively. The first extension hole 222 is located above the second terminal hole 22, and the second extension hole 223 is located above the third terminal hole 23. In the fifth embodiment of the male connector of the present invention, the first terminal hole 21 is a ground terminal hole, the second terminal hole 22 is a live terminal hole, and the third terminal hole 23 is a neutral terminal hole.

Therefore, the female connector of the fifth embodiment of the present invention is provided with the first extension partition plate 115 and the second extension partition plate 116. The first extension partition plate 115 is configured to separate the communication space between the first terminal seat 11 and the second terminal seat 12. The second extension partition plate 116 is configured to separate the communication space between the first terminal seat 11 and the third terminal seat 13.

The side wall of the second terminal seat 12, adjacent to the third terminal seat 13, and the side wall of the third terminal base 13, adjacent to the second terminal seat 12, are integrally formed with the first terminal seat 11, so that the second terminal seat 12 is separated from the third terminal seat 13. In use, when the female connector of the present invention is plugged and unplugged under power, the conductive terminal set 14 in the second terminal seat 12 and the conductive terminal set 14 in the first terminal seat 11 cannot be electrically connected due to the arrangement of the first extension partition plate 115, and the conductive terminal set 14 in the third terminal seat 13 and the conductive terminal set 14 in the first terminal seat 11 cannot be electrically connected due to the arrangement of the second extension partition plate 116, so that an electric arc will not be generated between the second terminal seat 12 and the first terminal seat 11 and between the third terminal seat 13 and the first terminal seat 11, thereby reducing potential safety hazards.

What is claimed is:

1. A female connector, comprising:

a ring-shaped outer wall;

a first terminal seat, a second terminal seat and a third terminal seat being disposed inside the ring-shaped outer wall, contours of end surfaces of the first terminal seat, the second terminal seat and the third terminal seat being cup-shaped with an opening facing a same direction respectively;

a plurality of conductive terminal sets, at least part of each of the plurality of conductive terminal sets being disposed in the first terminal seat, the second terminal seat and the third terminal seat and being exposed via the corresponding opening respectively;

the first terminal seat and the second terminal seat are connected via a first partition wall, and the first partition wall closes at least one passageway between the second terminal seat and the third terminal seat.

2. The female connector as claimed in claim 1, wherein the openings of the first terminal seat, the second terminal seat and the third terminal seat face the ring-shaped outer wall respectively.

3. The female connector as claimed in claim 2, wherein the first terminal seat and the third terminal seat are connected via a second partition wall, and the second partition wall closes at least one passageway between the second terminal seat and the third terminal seat.

4. The female connector as claimed in claim 3, wherein the conductive terminal set in the first terminal seat corresponds to a ground end, the conductive terminal set in the second terminal seat corresponds to one of a live end and a neutral end, and the conductive terminal set in the third terminal seat corresponds to the another one of the live end and the neutral end.

5. The female connector as claimed in claim 1, further comprising an extension partition plate, formed on a lateral surface of the first terminal seat and extending outward therefrom, the extension partition plate being configured to increase a creepage distance between the conductive terminal set in the first terminal seat and the conductive terminal set in the second terminal seat.

6. The female connector as claimed in claim 2, wherein the female connector is a power connector, and the first terminal seat, the second terminal seat and the third terminal seat do not include any terminal for signal transmission therein.

7. The female connector as claimed in claim 2, wherein the first partition wall is configured to increase a creepage distance between the conductive terminal set in the second terminal seat and the conductive terminal set in the third terminal seat, the first terminal seat and the third terminal seat are connected via a second partition wall, the second partition wall closes at least one passageway between the second terminal seat and the third terminal seat for further increasing the creepage distance between the conductive terminal set in the second terminal seat and the conductive terminal set in the third terminal seat, the conductive terminal set in the first terminal seat corresponds to a ground end, the conductive terminal set in the second terminal seat corresponds to one of a live end and a neutral end, the conductive terminal set in the third terminal seat corresponds to the other of the live end and the neutral end, the conductive terminal set of each of the second terminal seat and the third terminal seat includes an elastic plate and a terminal that are connected to each other, the terminal is supported on a bottom surface of each of the second terminal seat and the third terminal seat via the elastic sheet, the female connector serves as a connector for a power supply board, the first terminal seat, the second terminal seat and the third terminal seat do not include signal transmission terminals, a top of an inner wall of the ring-shaped outer wall has at least one protruding block for the first terminal seat, the second terminal seat and the third terminal seat not to extend out of the ring-shaped outer wall, and each of the first terminal seat, the second terminal seat and the third terminal seat is one-piece formed with three flat plates that are connected.

8. A male connector, comprising:

a first conductive terminal set;

a second conductive terminal set;

a third conductive terminal set; and a front connecting block, a front end surface of the front connecting block including a first terminal hole, a second terminal hole and a third terminal hole, the first terminal hole having a first terminal supporting surface for supporting the first conductive terminal set, the second terminal hole having a second terminal supporting surface for supporting the second conductive terminal set, the third terminal hole having a third terminal supporting surface for supporting the third conductive terminal set, wherein a distance between the first terminal supporting surface and the second terminal supporting surface in a thickness direction of the front connecting block is greater than a maximum inner diameter of the first terminal hole in the thickness direction of the front connecting block;

the first terminal hole and the second terminal hole communicate with each other via a first passageway on the front end surface.

9. The male connector as claimed in claim 8, further comprising a first extension hole extending outward horizontally from the first terminal hole.

10. The male connector as claimed in claim 8, wherein the first terminal hole and the third terminal hole communicate with each other via a second passageway on the front end surface, a distance between the first terminal supporting surface and the third terminal supporting surface in the thickness direction of the front connecting block is greater than the maximum inner diameter of the first terminal hole in the thickness direction of the front connecting block, the first passageway communicates with the first terminal hole via the second terminal supporting surface, and the second passageway communicates with the third terminal hole via the third terminal supporting surface.

11. The male connector as claimed in claim 10, wherein each of the second terminal supporting surface and the third terminal supporting surface is provided with a thickened wall, a material thickness of the thickened wall in the thickness direction of the front connecting block is greater than a material thickness of the first terminal supporting surface in the thickness direction of the front connecting block.

12. The male connector as claimed in claim 11, wherein the first terminal hole is arranged above the second terminal hole and the third terminal hole, the second terminal hole and the third terminal hole, the first terminal hole, the second terminal hole and the third terminal hole are evenly spaced, and the first terminal hole, the second terminal hole and the third terminal hole have a difference in area on the front end surface by less than 10%.

13. The male connector as claimed in claim 12, wherein the second terminal hole and the third terminal hole are separated by a barrier wall, and the barrier wall does not extend into the first terminal hole and is not supporting any conductive terminal set on a surface thereof.

14. The male connector as claimed in claim 13, wherein the first conductive terminal set corresponds to a ground end, the second conductive terminal set corresponds to one of a live end and a neutral end, and the third conductive terminal set corresponds to the other of the live end and the neutral end.

15. The male connector as claimed in claim 14, wherein at least one inner side wall of the first terminal hole, the second terminal hole or the third terminal hole has at least one guide bar, and the guide bar extends in a length direction of the male connector.

16. The male connector as claimed in claim 10, further comprising an inner insert, the inner insert being inserted into the front connecting block from another direction opposite to the front end surface, a terminal passageway being defined between an outer side of the inner insert and the front connecting block, the first conductive terminal set entering the first terminal hole via the terminal passageway, the inner insert having a first through hole and a second through hole, the second conductive terminal set entering the second terminal hole via the first through hole, the third conductive terminal set entering the third terminal hole via the second through hole.

17. The male connector as claimed in claim 16, wherein the inner insert and the front connecting block are connected together in a snap-fit manner by engagement of a locking block and a locking hole, connecting end surfaces of the front connecting block and the inner insert are tightly connected by a mating structure in which a concave portion is engaged with a convex portion, the second conductive terminal set and the third conductive terminal set are separated by the mating structure in which the concave portion is engaged with the convex portion.

18. The male connector as claimed in claim 17, wherein each of the second terminal supporting surface and the third terminal supporting surface is provided with a thickened wall, a material thickness of the thickened wall in the thickness direction of the front connecting block is greater than a material thickness of the first terminal supporting surface in the thickness direction of the front connecting block, first terminal hole is arranged above the second terminal hole and the third terminal hole, the second terminal hole and the third terminal hole, the first terminal hole, the second terminal hole and the third terminal hole are evenly spaced, the first terminal hole, the second terminal hole and the third terminal hole have a difference in area on the front end surface by less than 10%, the second terminal hole and the third terminal hole are separated by a barrier wall, the barrier wall does not extend into the first terminal hole and is not provided with a conductive terminal set on its surface, the first conductive terminal set corresponds to a ground end, the second conductive terminal set corresponds to one of a live end and a neutral end, the third conductive terminal set corresponds to the other of the live end and the neutral end, at least one inner side wall of the first terminal hole, the second terminal hole or the third terminal hole has at least one guide bar, and the guide bar extends in a length direction of the male connector.

* * * * *